(12) United States Patent
Nogi et al.

(10) Patent No.: US 6,499,456 B1
(45) Date of Patent: Dec. 31, 2002

(54) CYLINDER INJECTION ENGINE AND CONTROL APPARATUS AND METHOD THEREOF

(75) Inventors: Toshiharu Nogi, Hitachinaka (JP); Takuya Shiraishi, Hitachinaka (JP); Yoko Nakayama, Hitachi (JP); Noboru Tokuyasu, Hitachi (JP); Yusuke Kihara, Hitachi (JP); Yoshihiro Sukegawa, Hitachi (JP); Minoru Ohsuga, Hitachinaka (JP); Mineo Kashiwaya, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/653,807

(22) Filed: Sep. 1, 2000

(30) Foreign Application Priority Data

Feb. 29, 2000 (JP) ......................................... 2000-058026

(51) Int. Cl.$^7$ ............................ F02P 15/02; F02B 17/00
(52) U.S. Cl. ........................ 123/295; 123/305; 123/310; 123/638
(58) Field of Search ................................ 123/295, 305, 123/638, 310, 636, 640

(56) References Cited

U.S. PATENT DOCUMENTS

| | | | | |
|---|---|---|---|---|
| 5,105,795 A | * | 4/1992 | Ozawa et al. | 123/31 |
| 5,269,243 A | * | 12/1993 | Mochizuki | 123/310 |
| 5,529,038 A | * | 6/1996 | Tsuchida | 123/310 |
| 5,666,916 A | * | 9/1997 | Fujieda et al. | 123/310 |
| 5,894,826 A | * | 4/1999 | Jaye | 123/295 |
| 6,035,824 A | * | 3/2000 | Lee | 123/295 |
| 6,267,107 B1 | * | 7/2001 | Ward | 123/305 |

FOREIGN PATENT DOCUMENTS

JP        A-8-35429        2/1996

\* cited by examiner

*Primary Examiner*—Erick Solis
(74) *Attorney, Agent, or Firm*—Crowell & Moring LLP

(57) ABSTRACT

A cylinder injection engine includes a fuel injector for injecting a fuel into a combustion chamber formed between a cylinder head and a piston, an intake port opening to the combustion chamber, an intake valve disposed in the intake port, a plurality of spark plugs provided for each cylinder for effecting ignition of a mixture formed within the combustion chamber, an external EGR valve having a function of EGR amount control to the cylinder, and a gas flow control valve. The engine has air/fuel ratio mode setting and ignition mode setting.

19 Claims, 34 Drawing Sheets

(a)

FORMER MID STAGE IN EXHAUST STROKE (b)

LATER STAGE IN EXHAUST STROKE (a) TOP DEAD CENTER (b) INTAKE STROKE, START OF FUEL INJECTION

CYLINDER INJECTION ENGINE AND CONTROL APPARATUS AND METHOD THEREOF

BACKGROUND OF THE INVENTION

The present invention relates to a construction of a cylinder injection engine or a direct fuel injection engine with two or more spark plugs per each cylinder, a control apparatus and a control method therefor.

As shown in Japanese Patent Application Laid-Open No. JP-A-8-35429, a cavity is provided in a piston of the conventional cylinder injection engine to concentrate fuel within the cavity to make a mixture of air and fuel around a spark plug rich for certainly providing ignitionability even if the air/fuel ratio of the mixture in the overall cylinder is lean. However, since the mixture around the spark plug is rich, NOx tends to be generated. In particular, when a stratified charge combustion operation lasts in increasing of engine load, a problem is encountered in increasing of NOx emission. For purification of exhaust gas, it heavily depends on performance of NOx purifying catalytic converter. On the other hand, NOx can be reduced by EGR (Exhaust Gas Recirculation) to a homogeneous mixture. However, when single spark plug is employed, flame propagation velocity is lowered according to increasing of EGR amount to possibly make combustion unstable to degrade fuel saving effect. While a construction, in which two spark plugs are provided, has been put into practical use, improvement of fuel economy is still insufficient.

SUMMARY OF THE INVENTION

The present invention realizes quick combustion with dual-plug ignition system by applying EGR to a homogeneous mixture in a region where an engine output torque is relatively large by controlling stratified mixture and homogeneous mixture in the case where dual-plug ignition system is employed in a cylinder injection (direct fuel injection) system. In a range where the engine output torque is relatively small, stratified charge combustion operation is performed for improvement of fuel economy by super lean burn with large amount of EGR. In the later case, since the engine output torque is small and emission of NOx is small to be satisfactorily treated by post process after combustion. In a range where the engine output torque is further small, homogeneous charge compression ignition operation is performed. By this, reduction of both of fuel consumption and exhaust emission can be achieved.

An object of the present invention is to provide a construction of a cylinder ignition engine having two spark plugs in each cylinder, which enables homogeneous EGR operation and stratified EGR operation depending upon operating condition, fuel injection, air flow control, ignition control system and a control method therefor.

Another object of the present invention is to provide a control method for performing compression ignition without using the spark plug to realize low NOx emission.

According to one aspect of the present invention, a cylinder injection engine wherein each of cylinders is provided with a fuel injector for injecting fuel into a combustion chamber formed between a cylinder head and a piston, an intake port opening to the combustion chamber, an intake valve engaging with the intake port, a plurality of spark plugs provided for each cylinder for effecting ignition of a mixture formed within the combustion chamber, an external EGR valve having a function of EGR amount control to the cylinder, an intake and exhaust control valve, and means for setting air/fuel ratio modes and means for setting mode of switching spark plugs.

Preferably, the air/fuel ratio mode setting means has at least a stratified charge lean combustion mode concentrating the mixture around the spark plug, a stoichiometric mode for forming a homogeneous mixture and a homogeneous lean combustion mode.

Preferably, the air/fuel ratio mode setting means further has a compression ignition mode.

Preferably, two spark plugs are provided in each cylinder, a fuel is injected in an intake stroke, dual-plug ignition is performed under the condition where EGR is effected and, the mixture is concentrated to one of the spark plugs in stratified charge combustion operation.

Further preferably, when an engine revolution speed is lower than a predetermined value, the mixture is concentrated to the spark plug close to a tip end of the fuel injector, and when the engine revolution speed becomes higher than the predetermined value, the mixture is concentrated to the ignition valve located remote from the tip end of the fuel injector.

Still further preferably, the fuel injector is arranged on the side of suction stoke side of the cylinder, a tumble control valve is employed as a air flow control means for controlling the tumble control valve in closing direction under stratified charge combustion operation for strengthen tumble for concentrate the fuel injected in the compression stroke to one of the spark plugs by the tumble flow.

By the foregoing control, homogeneous mixture is formed in the range where the engine output torque is large to realize fast combustion upon application of EGR by dual-plug ignition. Furthermore, in the range where the engine output torque is smaller than the former mode, more fast combustion in stratified mixture with applying EGR is achieved to whereby achieve both of fuel economy and reduction of emission (NOx component).

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE EMBODIMENTS

The present invention will be discussed hereinafter in detail in terms of the preferred embodiments of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1:
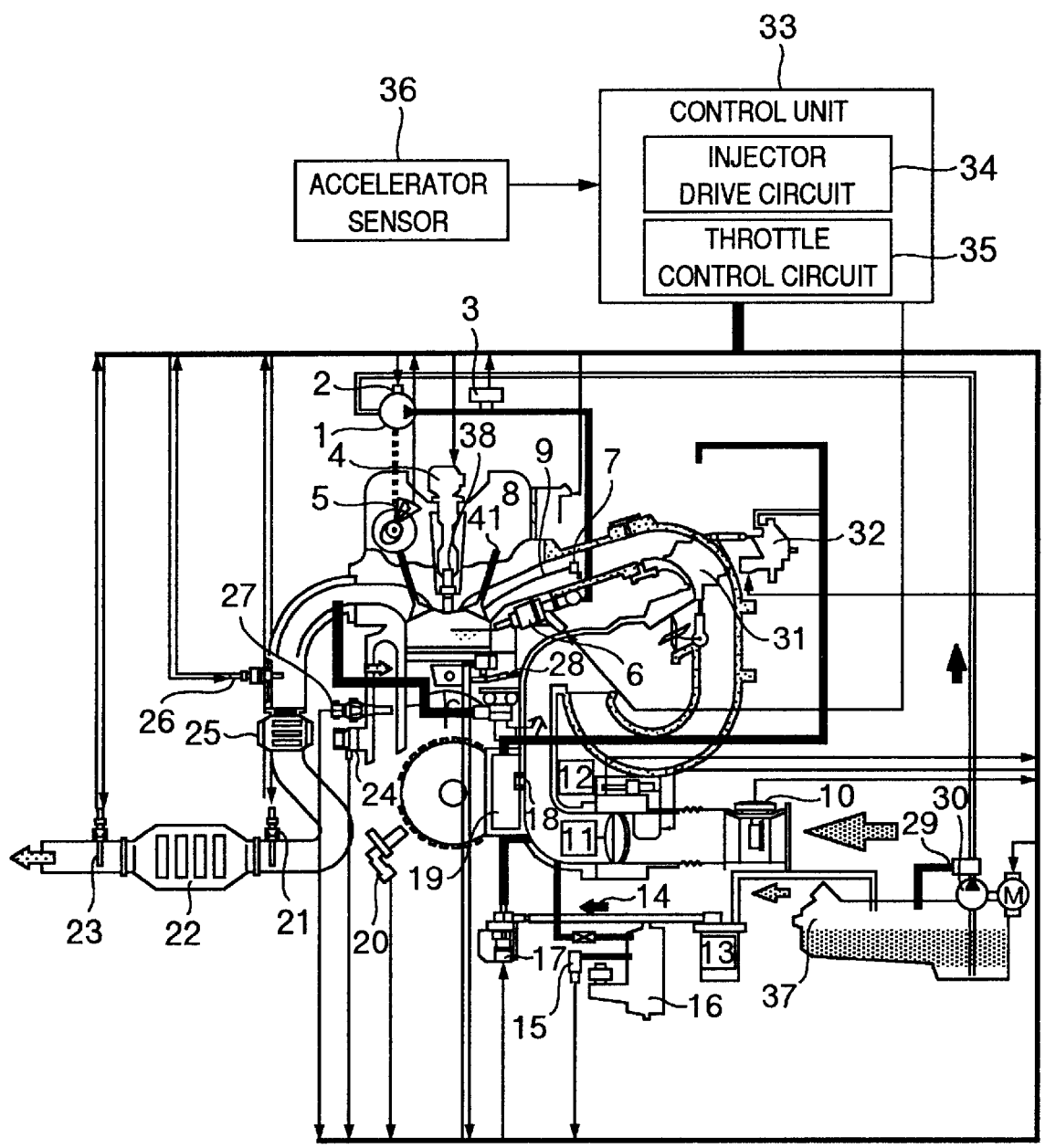
FIG. 1 is an illustration of the first embodiment of an engine and its control system according to the present invention.

A construction of the first embodiment of the present invention is illustrated in FIG. 1. Air is introduced into an engine through an air flow rate sensor 10, a throttle valve 11, an intake port and an intake valve 41. An intake air flow rate can be controlled by varying an open degree of the throttle valve 11. The intake air flow rate is measured by the air flow sensor 10.

In the intake port, a partition 9 and a flow control valve 7 are provided for controlling flow of the intake air. Upon formation of a tumble, the flow control valve 7 and the partition are provided in each intake port. When the flow control valve is closed, air flows from a branch passage to enhance tumble. Upon formation of swirl flow, the flow control valve is provided in one of the intake ports, and no partition is provided. In this case, when the intake port is closed, air flow toward one of the intake valves is generated to form a swirl flow in the cylinder. An open degree of a flow dividing valve 7 is controlled by a stepping motor, for example. A secondary passage can be an independent passage provided on the outside of the intake passage, or, in the alternative, ca be formed by providing a cut-out on the side of one of the intake valves of the flow dividing valve 7.

A spark spark plug 38 is supplied with ignition energy by a spark ignition device 4 for generating spark at an arbitrary timing.

In a passage connecting an exhaust pipe and the intake port, an exhaust gas recirculation (EGR) control valve 28 is provided for controlling external EGR amount (exhaust gas recirculation amount). On the other hand, in order to control opening and closing timing of the intake valve and an exhaust valve, a variable timing valve mechanism 8 is provided. Open degrees of the intake valve and the exhaust value are detected by a cam phase sensor 5.

In an air induction passage, a passage switching valve and a vacuum actuator 31 are provided and the vacuum actuator 31 is driven by controlling a three-way valve 32 for switching the induction passage. By this, a torque characteristic throughout a range from low engine speed to high engine speed can be improved.

The fuel is introduced into a high pressure fuel pump 1 through a low pressure feed pump 30 and a pressure regulator 29. A fuel pressure is detected by a pressure sensor 3 for feedback controlling a discharge pressure to be a predetermined value by a control valve 2 provided in the pump 1.

An engine speed is detected by a crank angle sensor 20. An engine coolant temperature is detected by an engine coolant sensor 27. An engine knocking magnitude is detected by a knock sensor 24.

In the exhaust pipe, a pre-catalytic converter 25 and another catalytic converter 22 located downstream of the pre-catalytic converter 25. When lean burn operation is to be performed, a three-way catalyst is provided in the pre-catalytic converter and NOx reducing function is provided in the downstream side catalytic converter. When only stoichiometric operation is performed, three-way catalyst are provided in both of the catalytic converters.

On upstream of the pre-catalytic converter 22, an air/fuel mixture ratio sensor 26 is provided. At an inlet of the catalytic converter 22, an exhaust gas temperature sensor 21 is provided. On the other hand, at an outlet of the catalytic converter 22, an oxygen sensor 23 is provided.

The reference numeral 12 denotes a unit including a throttle position sensor and a stepping motor, 13 denotes a canister for absorbing fuel vapor, 14 denotes a vacuum check valve, 15 denotes a sensor for detecting a pressure in a brake booster 16, 17 denotes a purge valve for purging the vapor absorbed by the canister, 19 denotes a vacuum reservoir tank.

Figure 12:
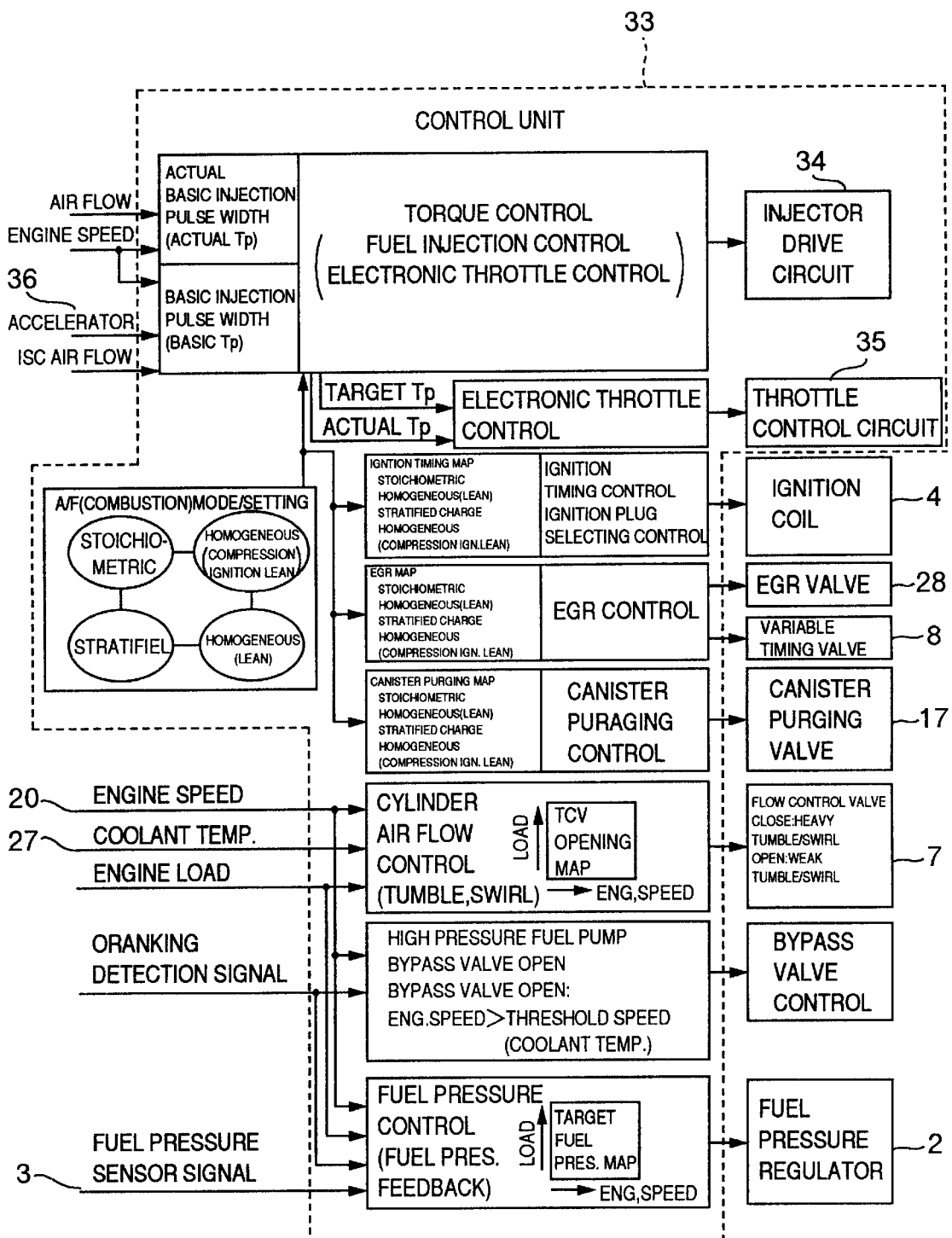
FIG. 12 is a block diagram of a control system of the first embodiment of the engine according to the present invention.

The reference numeral 33 denotes a control unit which can be realized by a combination of a microcomputer (not shown) or a digital signal processor and an electronic circuit. The microcomputer receives a signal from an accelerator sensor 36 detecting depression stroke of an accelerator pedal and signals from several other sensors arranged in various portion of the engine to generate signals for controlling respective actuators according to a control program (e.g. control flowchart shown in FIG. 14). In FIG. 12, detailed construction of the control unit 33 and connection with actuators are illustrated. The control unit includes an injector drive circuit 34 and an electronic throttle control circuit 35.

With the construction set forth above, a fuel injection control, an air control, a catalytic converter control for the engine can be performed.

Figure 2:
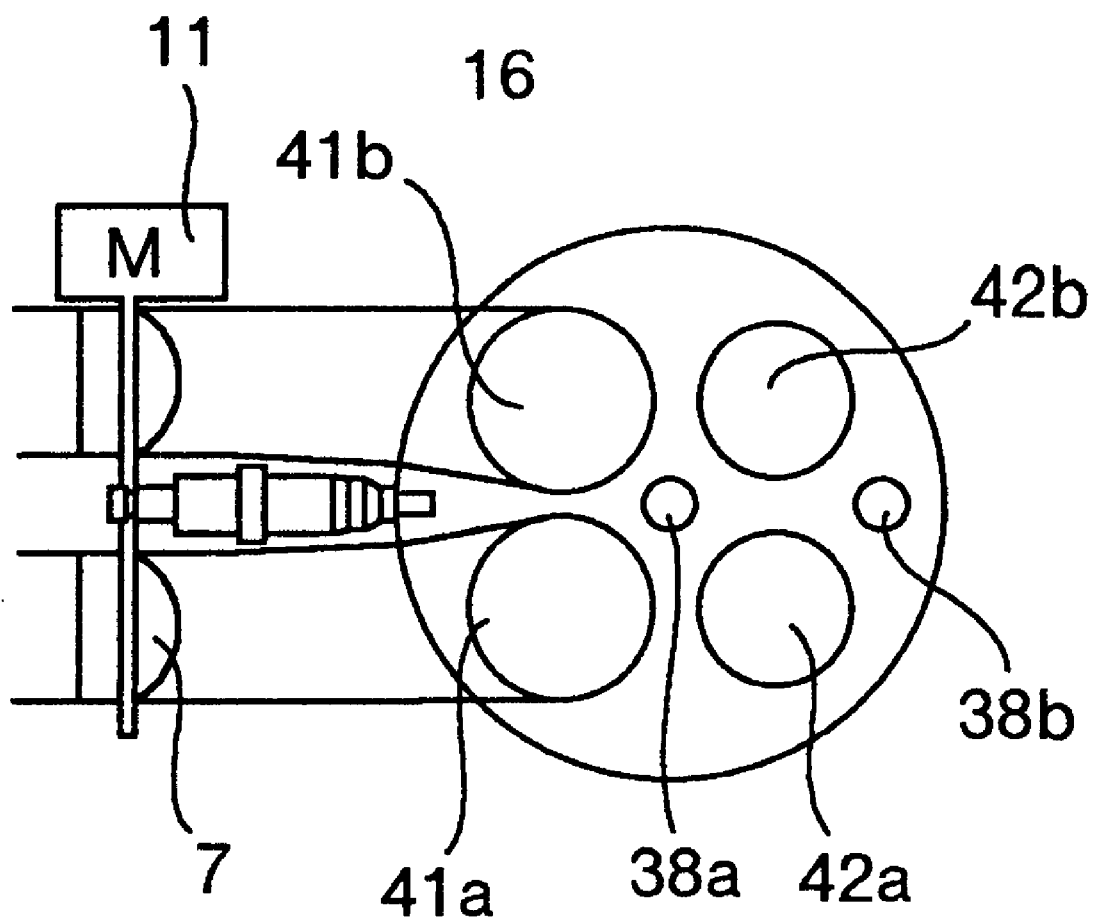
FIG. 2 is a cross section of one cylinder of the first embodiment of engine according to the present invention.

FIG. 2 shows an illustration of the engine as viewed from the top in the construction according to the present invention. Two intake valves 41a and 41b are provided. Between these two intake valves 41a and 41b, a fuel injector 6 is arranged. At the center of the cylinder, an spark plug 38a is positioned. Another spark plug 38b is provided in the vicinity of the peripheral end of the cylinder. A flow control valve 7 is provided in an intake port. An open degree of the flow control valve 7 is adjusted by means of a stepping motor 12, for example. By narrowing the opening by the flow control valve 7, strength of tumble can be increased. It is desirable to arrange the spark plugs 38a and 38b coaxially (in alignment) with respect to a fuel injecting direction of the fuel injector 6. The reason is that the injected fuel is transferred to the spark plug by tumble, and thus is preferable to arrange these in alignment.

Figure 3:
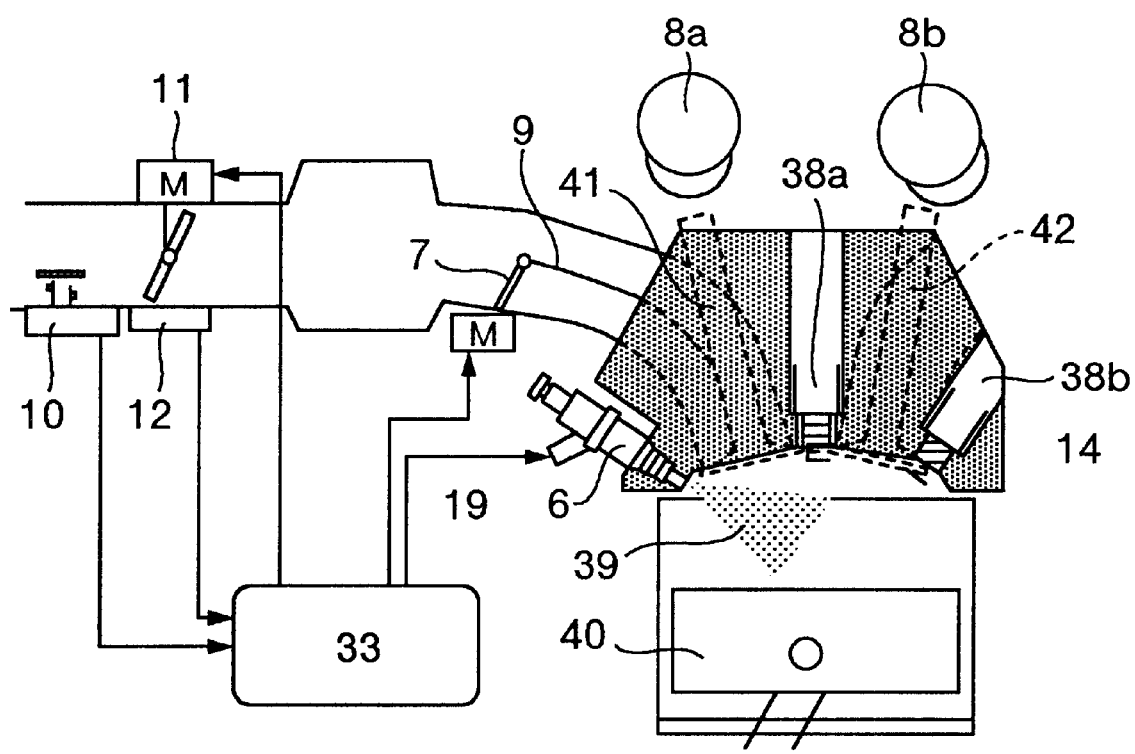
FIG. 3 is a partial longitudinal section of the first embodiment of the engine according to the present invention.

FIG. 3 shows a longitudinal section of the engine. An intake air flow rate is detected by the air flow sensor 10. The intake air flow rate is controlled by the electronically controlled throttle valve 11. A passage in the air induction pipe is divided into two by a partition 9. Enhancement of tumble is realized by narrowing the opening by the flow control valve 7 and flowing the intake air on an upper surface side of the intake valve 41. By arranging the fuel injector 6 on the side of the intake port, deposition on the injector can be prevented. In the intake valve and the exhaust valve, variable timing valve mechanisms 8a and 8b are provided for controlling opening and closing timing.

Figure 4:
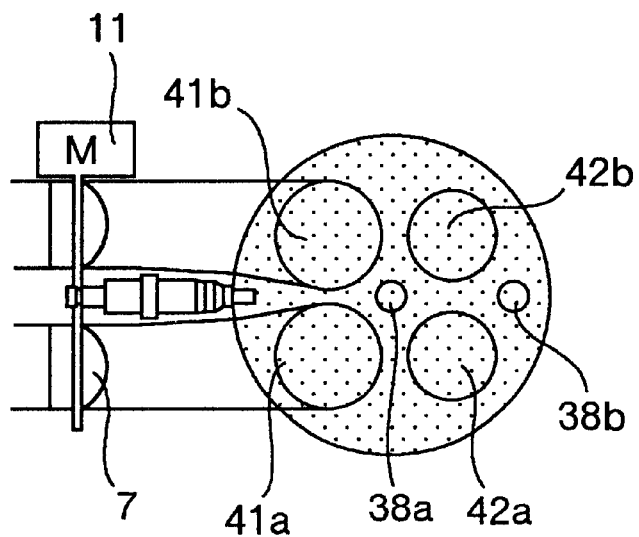
FIG. 4 is a partial cross section for explaining operation of the first embodiment of the engine according to the present invention.

FIG. 4 shows an example of operation. When a homogeneous mixture is formed in the cylinder, the fuel is injected from the fuel injector 6 in an intake stroke. By thus, the fuel and the intake air can be sufficiently mixed to form a homogeneous mixture as shown. When an EGR gas is admixed to the intake air, a mixture, in which the fuel is admixed with the air and the EGR gas, is formed.

Figure 5:
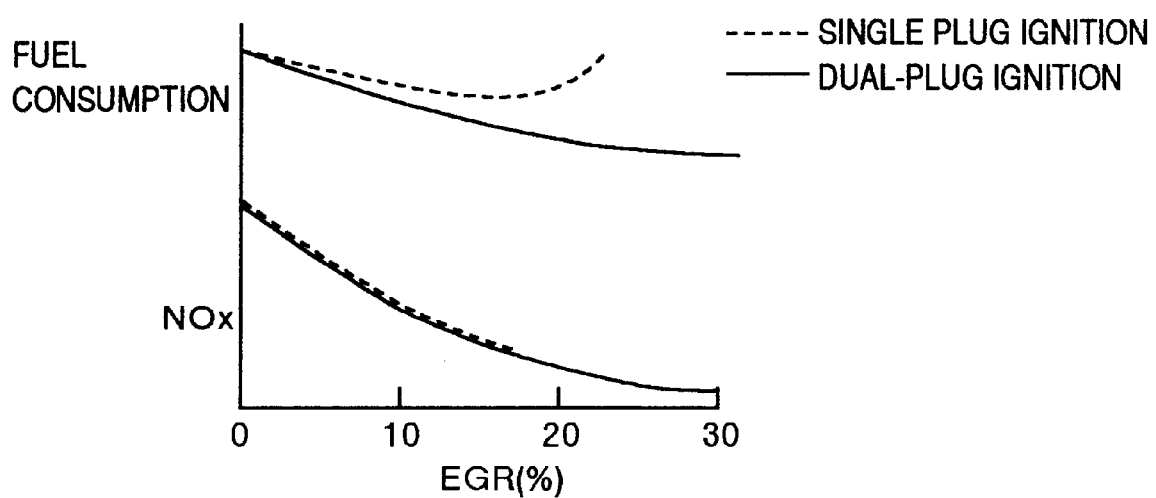
FIG. 5 is an EGR characteristic chart for explaining operation of the first embodiment of the engine according to the present invention.

FIG. 5 shows effects for fuel consumption and NOx emission versus EGR ratio. By increasing EGR ratio under the condition where the air/fuel ratio is constant, amount of gas to be introduced is increased to increase open degree of the throttle valve. By this, a pressure in the induction pipe approaches with atmospheric pressure for reducing pumping loss and reducing fuel consumption amount. On the other hand, by applying EGR, combustion temperature can be lowered to reduce NOx emission. However, due to application of EGR, combustion velocity becomes low and combustion efficiency also becomes low. Therefore, flame propagation distance can be shortened to reduce fuel consumption by employing two spark plugs.

Figure 6:
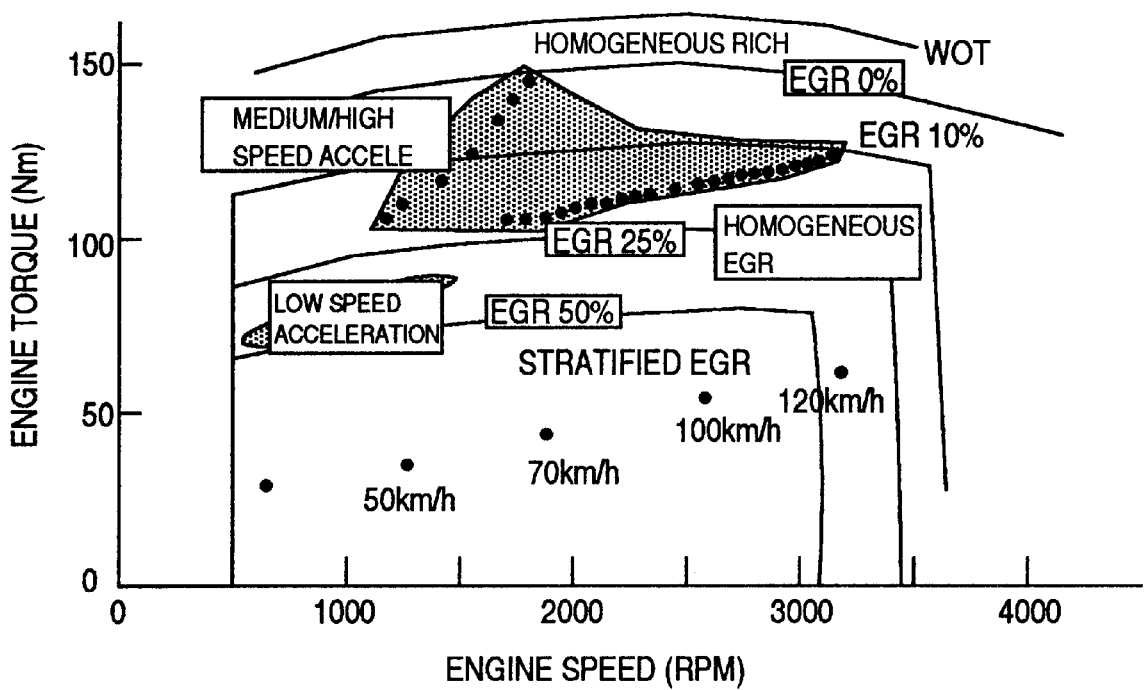
FIG. 6 is an explanatory illustration for explaining operation of the first embodiment of the engine according to the present invention.

FIG. 6 shows engine operation points and operation modes in various driving modes. When the engine output torque is large, homogeneous mixture is formed by injection in the intake stroke. According to lowering of the engine output torque, the EGR ratio is increased to reduce pumping loss and to improve fuel economy. In a range where engine output torque is further small, since the EGR ratio has to be greater than or equal to 25%, it becomes difficult to maintain combustion efficiency even by two-point ignition. Therefore, operational mode is switched to stratified charge combustion operation to increase fuel concentration in the mixture around the spark plug for permitting increase of the EGR ratio. By this, flame propagation velocity becomes higher than that in homogeneous mixture operation. Thus, combustion efficiency can be improved.

Figure 7:
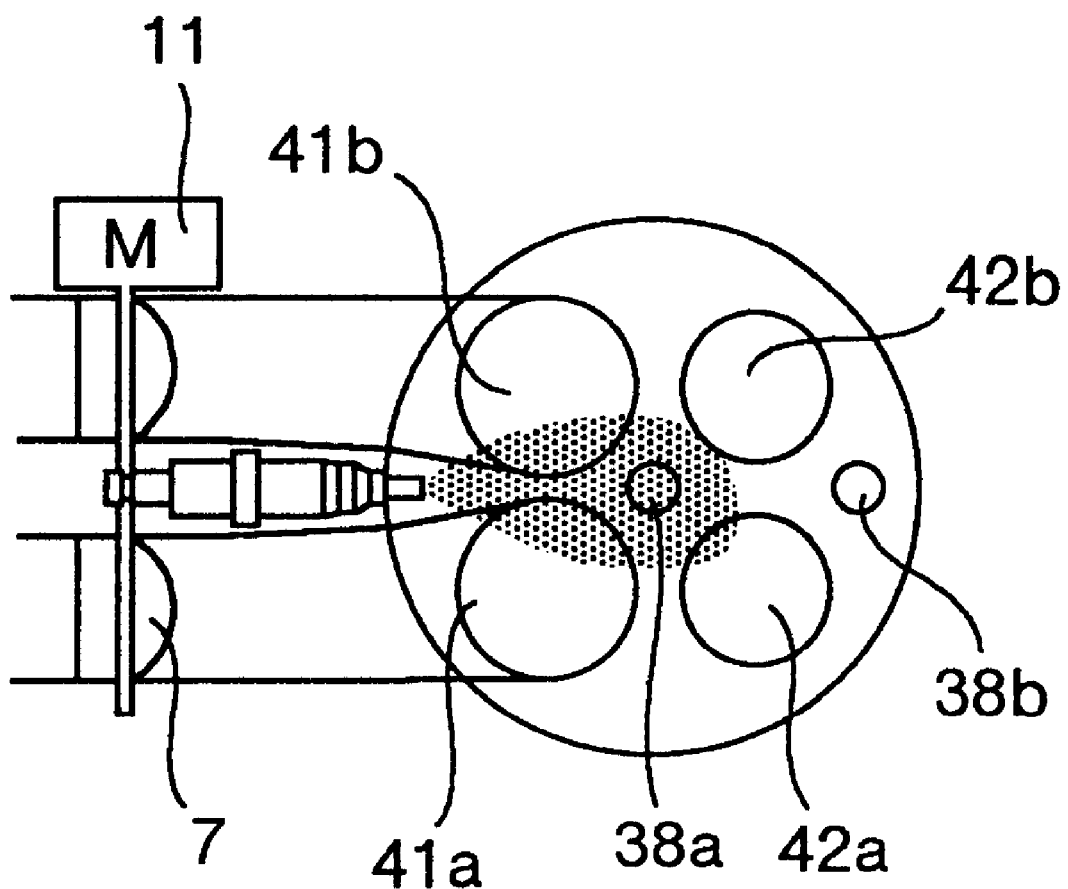
FIG. 7 is a cross section of one cylinder of the first embodiment of the engine according to the present invention.
Figure 8:
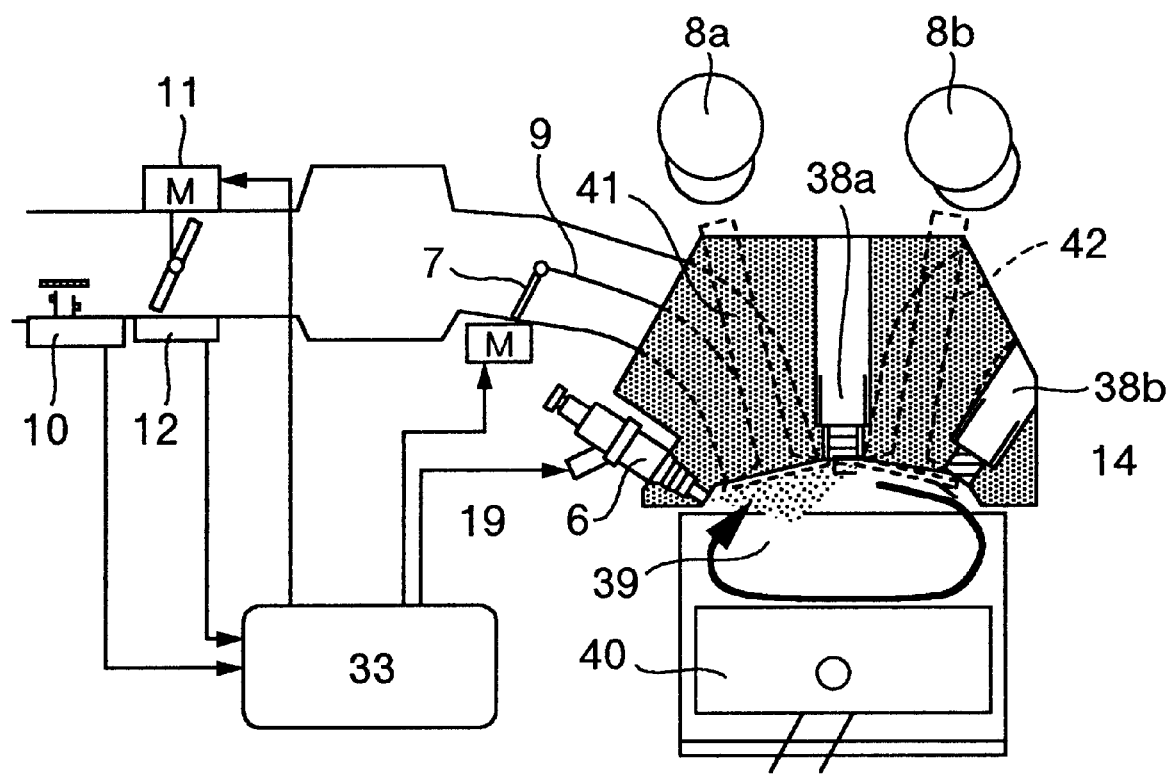
FIG. 8 a partial longitudinal section of the engine according to the present invention.

A control method in stratified charge combustion operation will be discussed with reference to FIGS. 7 and 8. Fuel 39 injected from the fuel injector 6 is transferred to the spark plug 38a by tumble air flow. A fuel injection timing is selected for injecting the fuel in compression stroke. The fuel injection timing is more advanced at higher engine revolution speed. The tumble air flow can be formed by closing the flow control valve 7 provided in two intake ports. In the shown embodiment, since the fuel is not transported toward the spark plug as guided by a piston wall, a flat head piston may be used. In the alternative, the piston may be formed into a shape maintaining tumble. In the conventional cylinder injection, a large cavity is formed on the piston head for guiding the fuel to possibly cause interference between the piston and the valve in case of the variable timing valve, to increase surface area of the piston to increase cooling loss to be a factor to obstruct improvement of fuel economy. In the shown system, since stratified charge can be done by the piston having substantially flat head, the system of the present invention is superior in improvement of fuel economy.

Figure 9:
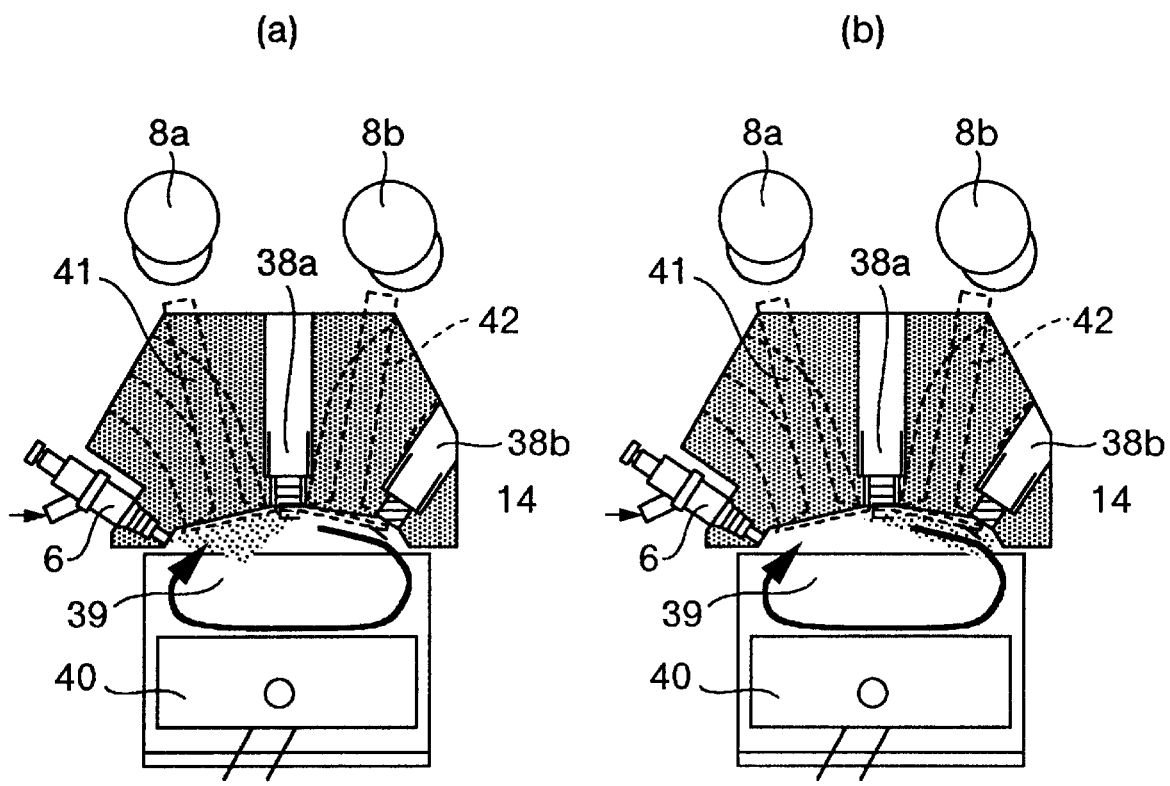
FIG. 9 is a partial longitudinal section for explaining the operation of the first embodiment of the engine according to the present invention.

In FIG. 9, (a) shows a behavior of the mixture flow as stratified at low engine revolution speed. The mixture is concentrated to the spark plug 38a. On the other hand, as shown in FIG. 9, (b), the fuel is concentrated to the spark plug 38b at high engine revolution speed. This can be realized by controlling the fuel injection timing and ignition timing. Particularly, at high engine revolution speed, the fuel injection timing is advanced. By this, even at high engine revolution speed, sufficient period may be provided from fuel injection to spark ignition for promoting vaporization of the fuel to improve stability of combustion. On the other hand, the fuel insufficiently vaporized may not reach the spark plug to successfully prevent smudging of the spark plug under cold engine condition.

Figure 10:
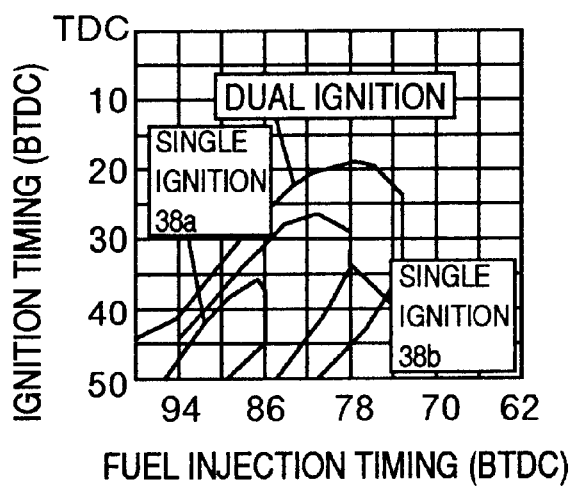
FIG. 10 is a chart showing a test result of the first embodiment of the engine according to the present invention.

FIG. 10 is an illustration showing a result of comparison of stable combustion range when the fuel injection timing and the ignition timing are varied. Under stratified charge condition at high engine revolution speed, the stable combustion range can be expanded by stratified charge to the spark plug 38b rather than that to the spark plug 38a. On the other hand, stable combustion can be achieved even when spark ignition is effected by two spark plugs with stratified charge to the spark plug 38b. In this case, most of the fuel is burnt by the spark plug 38b and the fuel remained around the spark plug 38a can be burnt by the spark plug 38a to slightly improve stability.

Figure 11:
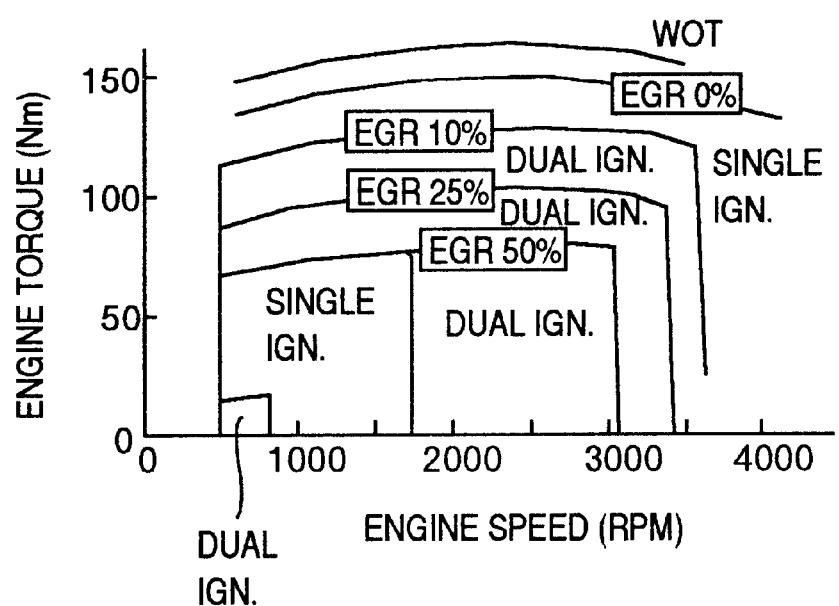
FIG. 11 shows one example of a control map of an ignition timing and a fuel injection timing.

FIG. 11 shows a control map of the ignition timing and EGR with respect to the engine output torque and the engine revolution speed. In the engine idling condition, air flow is weak and the mixture is unstable. Therefore, dual-plug ignition is performed. When the load is increased, the stratified rich mixture is approached to the spark plug 38a to perform spark ignition by the spark plug 38a. At this time, fuel injection timing is the compression stroke. At high engine revolution speed, the mixture is stratified to the spark plug 38b. However, disturbance of air flow becomes significant to make stratification insufficient. Therefore, spark ignition is effected by both spark plugs. In either case, EGR amount is made large to improve fuel economy and to reduce NOx emission. For obtaining greater engine output torque, the fuel is injected in the intake stroke to form homogeneous mixture, and the EGR ratio is set about 25%. At this time, in order to attain high combustion velocity, fuel ignition is effected. According to increase of load, EGR ratio is reduced. By further increasing load and decreasing the EGR, the combustion velocity becomes excessively high to abruptly increase combustion pressure to make combustion noise large. Therefore, ignition is switched to single plug ignition.

FIG. 12 shows a control map if combustion mode. By deriving an actual basic injection pulse width Tp on the basis of the intake air flow rate and the engine revolution speed and a demand torque of a driver from a depression stroke of the accelerator pedal, torque control is performed and fuel injection control and electronic throttle control is performed. As combustion mode, homogeneous stoichiometric mode, homogeneous lean mode and stratified charge mode. Also, compression ignition mode may be added as required. Depending upon these combustion modes, ignition timing and EGR map, canister purge map, flow control valve open degree map for controlling flow within the cylinder are switched. Depending upon EGR, an external EGR value and an internal EGR control by the variable timing value are controlled. Since temperature of the internal EGR gas is higher than the external EGR gas, vaporization of fuel can be promoted to be effective for reduction of HC and smoke emissions. Upon cranking, a bypass valve of a high pressure pump is opened to permit the fuel of the low pressure pump to be directly fed to the fuel injector. A fuel pressure is controlled by controlling an open degree of a fuel pressure regulator on the basis of a fuel pressure sensor signal and performing feedback of the fuel pressure.

Figure 13:
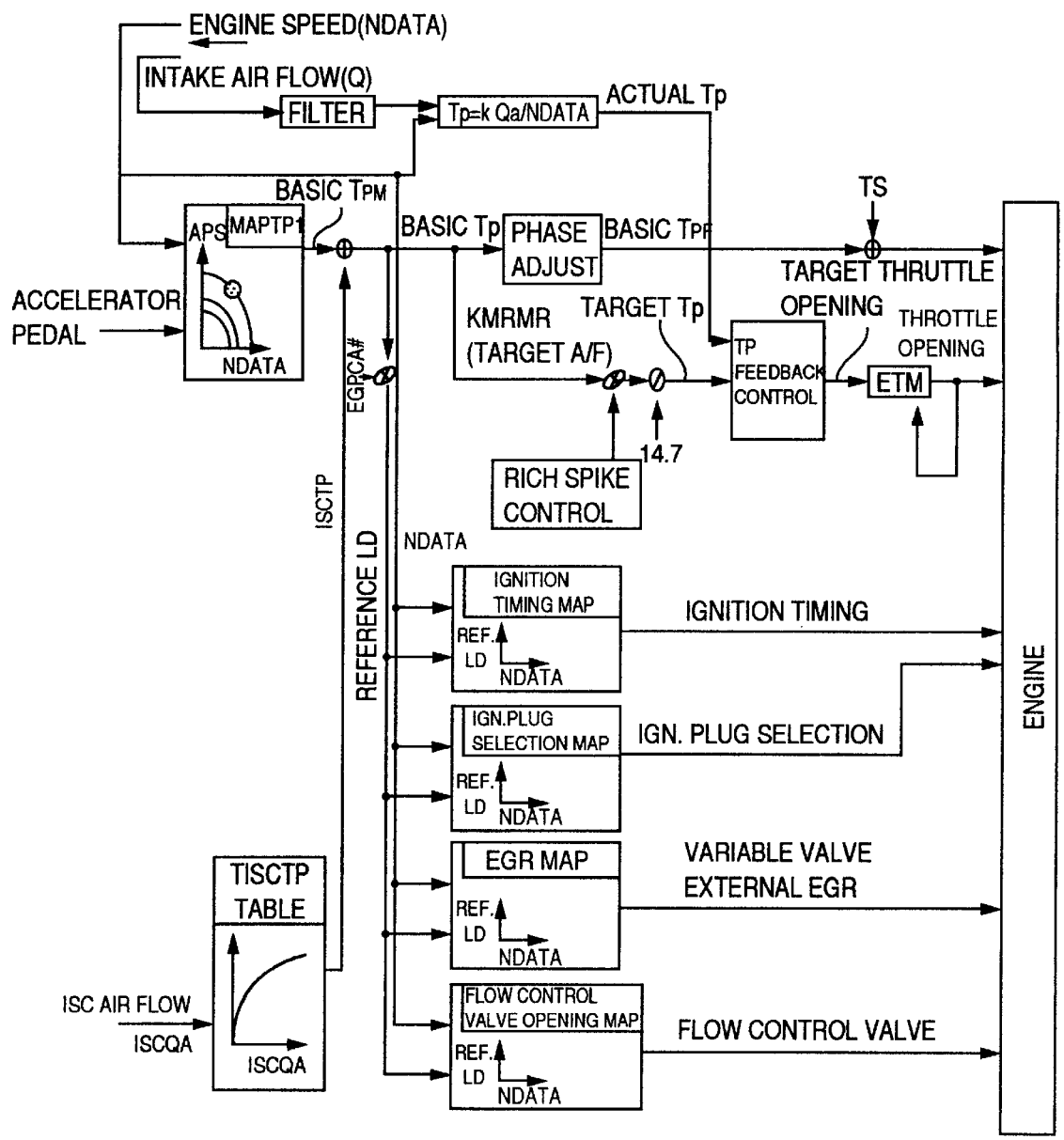
FIG. 13 is a block diagram of a control system of the first embodiment of the engine according to the present invention.
Figure 14:
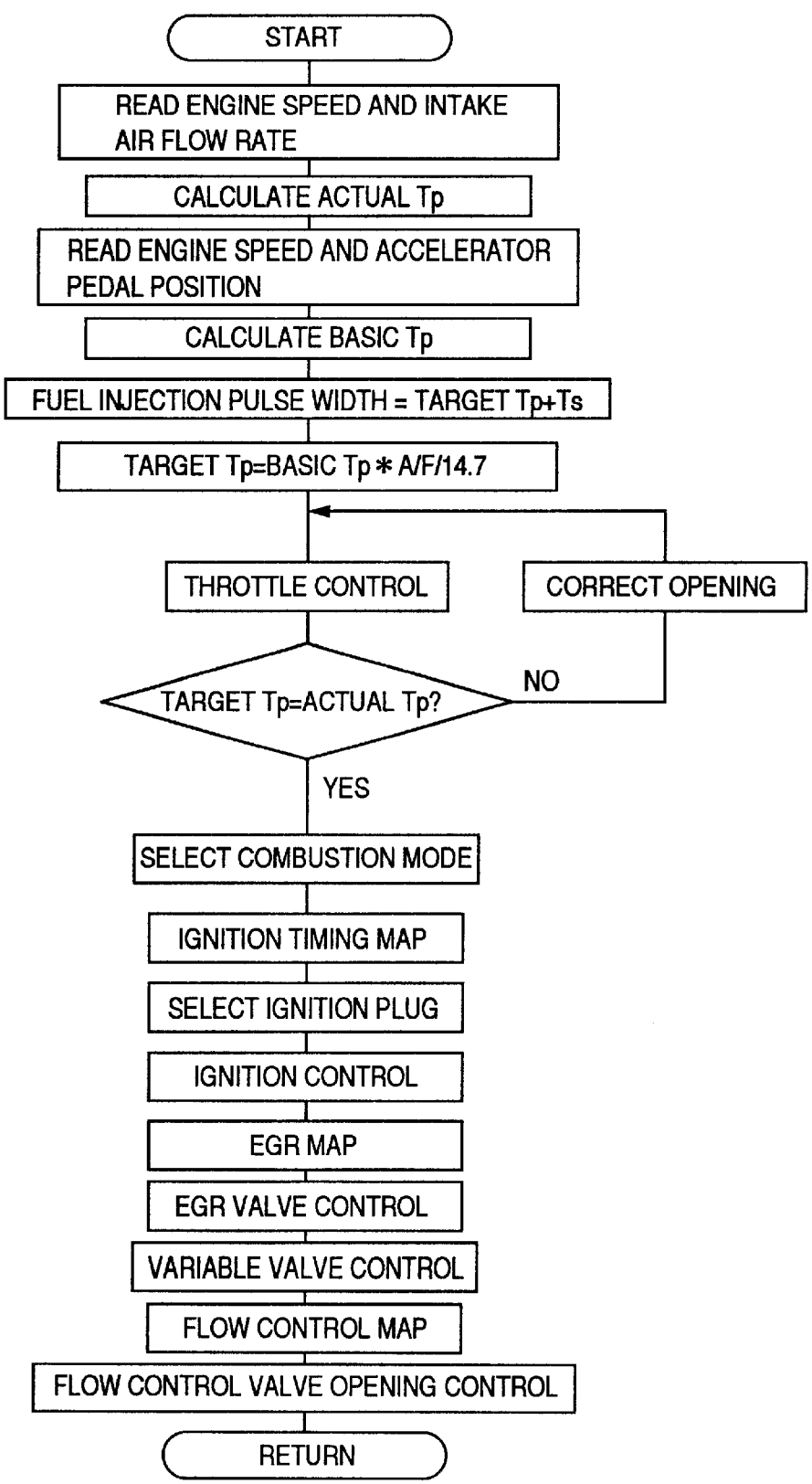
FIG. 14 is a flowchart of control operation of the first embodiment of the engine according to the present invention.

FIGS. 13 and 14 are control block diagram and flowchart. Actual Tp is derived on the basis of the intake air flow rate and engine revolution speed. On the other hand, a reference injection pulse width Tp is derived on the basis of the depression stroke of the accelerator pedal and the engine revolution speed, and a reference injection pulse width Tp with further taking ISC air flow rate into account. By adding ineffective injection pulse width Ts to the reference injection pulse width Tp, the fuel injection pulse width is determined for driving the fuel injector. For controlling intake air flow rate, the open degree of the electronically controlled throttle valve is controlled for reducing a difference between the reference Tp derived by the depression amount of the accelerator pedal and the actual Tp derived from the intake air flow rate. As set forth above, torque control and air/fuel ratio control can be performed depending upon the operation of the driver. Furthermore, depending upon combustion mode, ignition timing, spark plug selection, EGR, flow control are performed for driving respective actuators.

Figure 15:
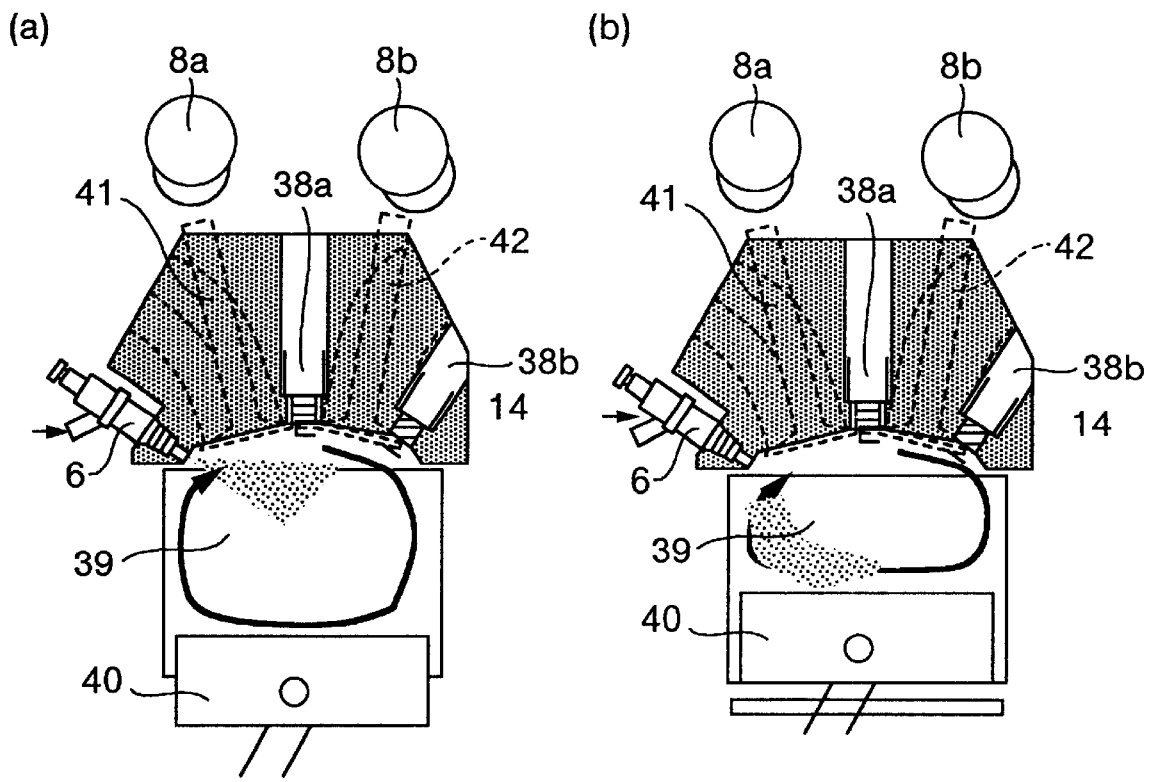
FIG. 15 is an explanatory illustration of operation in the case where fuel injection is performed in intake stroke.

In FIG. 15, (a) shows explanation for the case where the present invention is realized by another fuel injection control. In the intake stroke, fuel injection is performed. At the low engine revolution speed, fuel is circulated by tumble flow. When the fuel circulated with the tumble flow reaches the spark plugs 38a and 38b, spark ignition is performed. In the stratified charge combustion operation, optimal fuel economy is achieved by ignition at about 10 to 20° BTDC. Adapting to the ignition timing, fuel injection timing and control of strength of tumble flow by the flow control valve is performed so that the fuel vapor may reach the spark plugs at the ignition timing. Merit of fuel injection in the intake stroke in comparison with stratified charge combustion method in the compression stroke, sufficient time can be provided from the end of fuel injection to the start of spark ignition to certainly provide a time for vaporization of fuel to improve formation of the air/fuel mixture.

Since the fuel is injected between two intake valves, wall is formed between tumbles formed per each of two intake valves to maintain stratification. However, since the fuel is injected in the intake stroke, the fuel can be easily dispersed in comparison with the case where fuel injection is performed in the compression stroke. Therefore, by effecting spark ignition by two spark plugs, combustion is assured even with the dispersed mixture. Also, for degree of stratification is low, NOx emission can be reduced.

Figure 16:
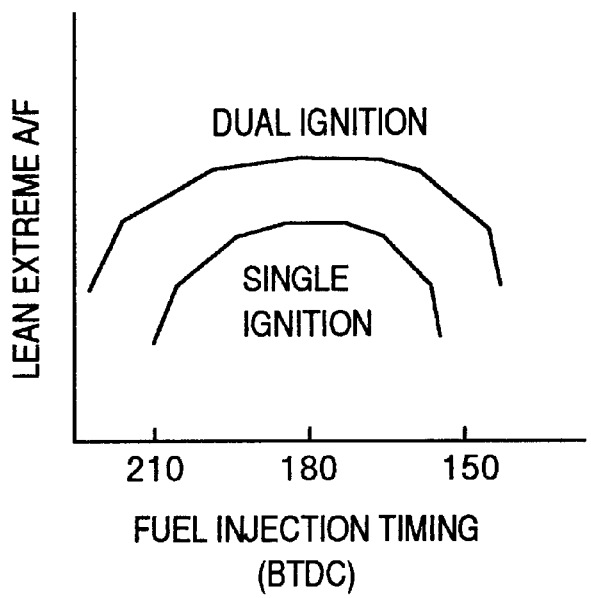
FIG. 16 shows a test result of the first embodiment of the engine according to the present invention.

FIG. 16 shows a relationship between the fuel injection timing and lean extreme limit of air/fuel ratio and shows the case where fuel injection is performed in the intake stroke and stratification is performed by early injection. By dual plug ignition, the extreme limit of the lean air/fuel ratio can be expanded. For expanding a lean extreme, it becomes necessary to select the fuel injection timing, at which the mixture may reach the spark plug. The fuel injection timing is variable depending upon the engine revolution speed and tumble strength to require adjustment by providing a map depending upon operating condition.

Figure 17:
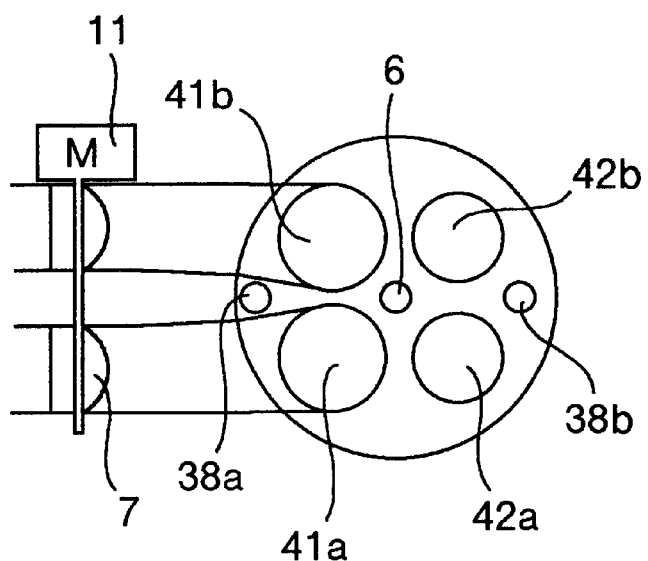
FIG. 17 is a cross section of the second embodiment of the engine according to the present invention.
Figure 18:
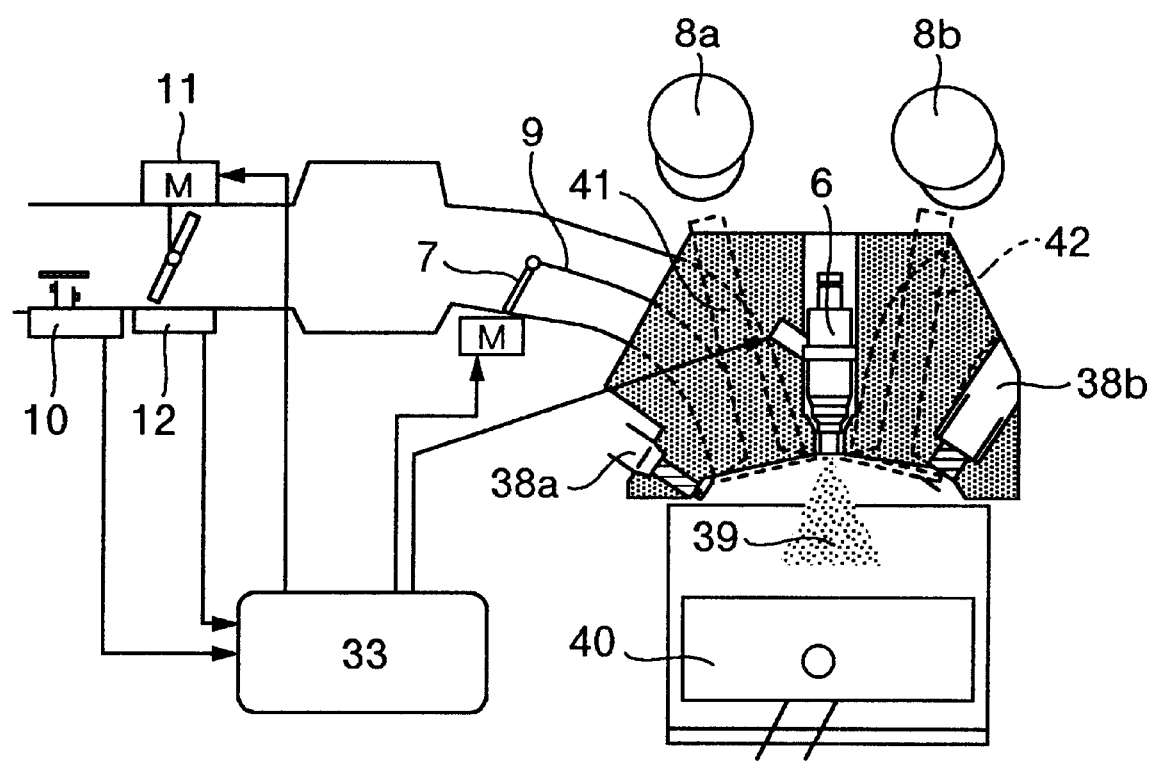
FIG. 18 is a longitudinal section of the second embodiment of the engine according to the present invention.

FIGS. 17 and 18 show the second embodiment of the engine according to the present invention. The fuel injector 6 is arranged at the center of the cylinder (top of a combustion chamber). The spark plug is arranged in the vicinity of the cylinder side wall on the sides of the intake valves and the exhaust valves. Preferably, the spark plugs are arranged in alignment with the injection opening of the fuel injector. In the intake port, the flow control valve 7 and the partition 9 are provided for forming tumble flow. By arranging the fuel injector at the center of the cylinder, the injected fuel can be dispersed over the entire area of the cylinder to promote homogenizing of the mixture to improve the torque at wide open throttle (WOT), homogenization performance (EGR, lean burn operation).

Figure 19:
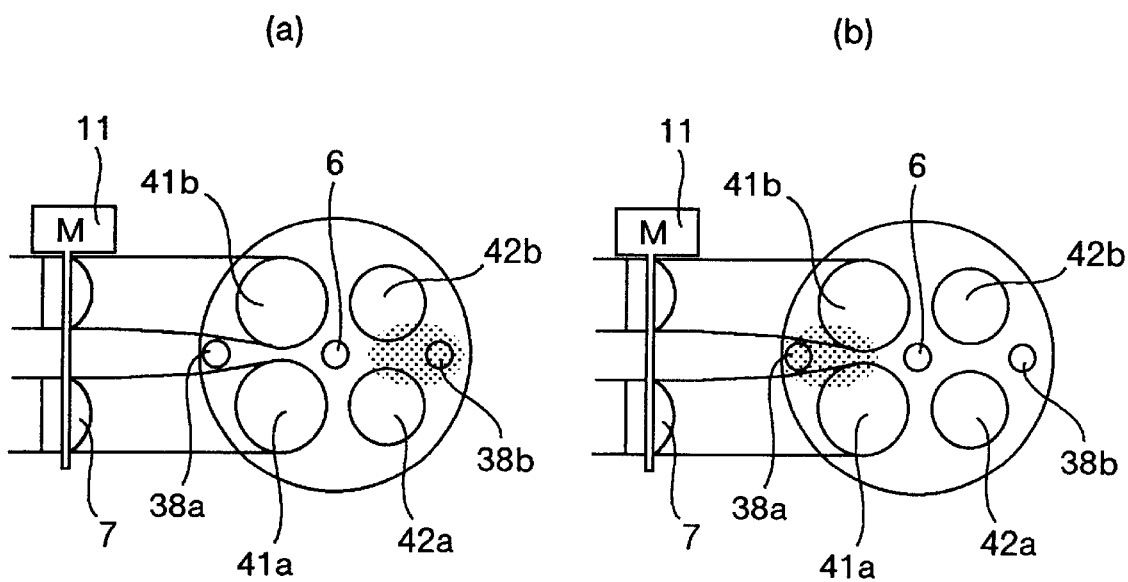
FIG. 19 is a cross section of one cylinder for explaining operation of the third embodiment of the engine according to the present invention.
Figure 20:
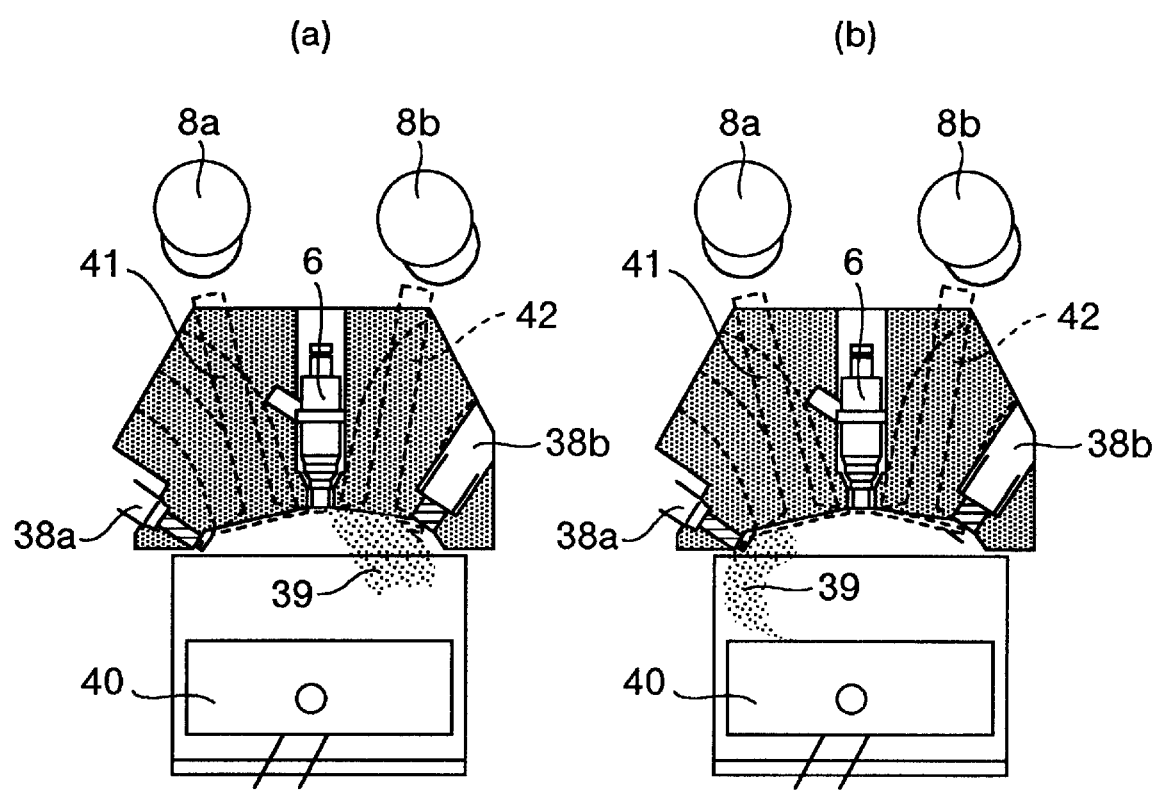
FIG. 20 is a partial longitudinal section for explaining operation of the third embodiment of the engine according to the present invention.

FIG. 19, (a) and FIG. 20, (a) show distributing condition of the fuel upon stratification. The fuel injected from the fuel injector 6 is transferred to the spark plug 38b by tumble flow. The injection timing of the fuel is the compression stroke. So as to permit selection of the ignition timing for achieving fuel economy, the fuel injection timing is adjusted. As shown in FIGS. 19, (b) and 20, (b), it is possible to inject the fuel in the intake stroke to transfer by the fuel 39 by tumble flow to concentrate around the spark plug 38a on the side of the intake port. In this case, since sufficient period can be provided from injection of the fuel to spark ignition, vaporization of the fuel can be promoted during this period to improve ignitionability and to reduce HC and NOx. It is also possible that, at low engine revolution speed range, since air flow is weak, fuel injection is performed in the compression stroke as shown in FIG. 19, (a) to shorten a period from injection to spark ignition to prevent dispersion of the fuel, and at high engine revolution speed range, the mixture is transported by tumble flow to perform spark ignition by the spark plug 38a as shown in FIG. 19, (b) for certainly provide vaporization period.

Figure 21:
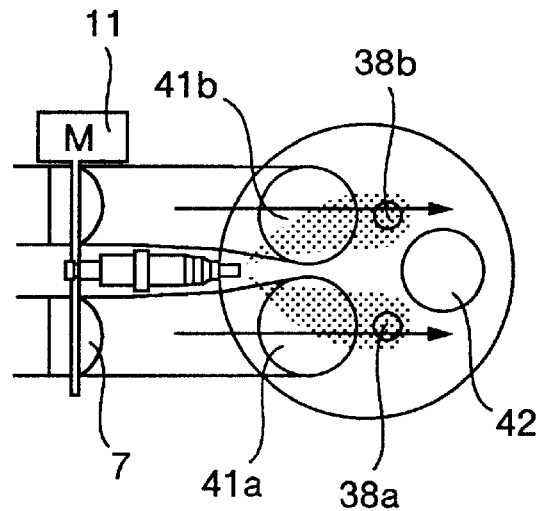
FIG. 21 is a cross section of a further embodiment of the engine according to the present invention.
Figure 22:
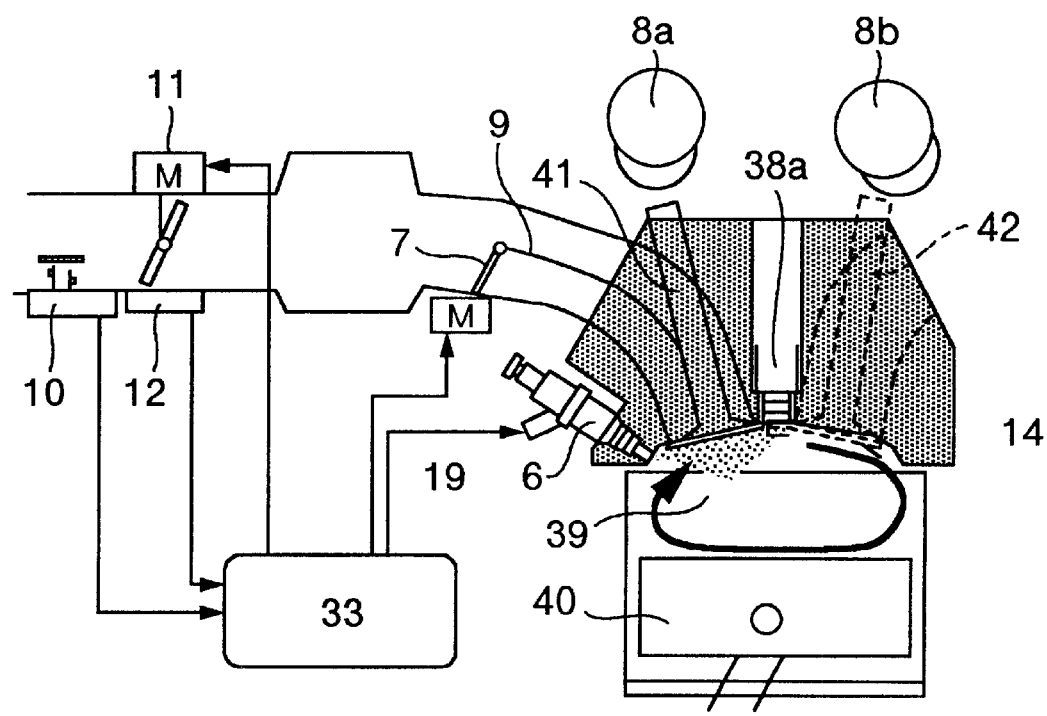
FIG. 22 is a longitudinal section of a further embodiment of the engine according to the present invention.

FIGS. 21 and 22 shows the third embodiment of the present invention. The fuel injector 6 is arranged in the vicinity of the cylinder wall on the side of the intake port. The spark plugs are arranged in the vicinity of the outlets of respective intake valve ports. Fuel vapor from the fuel injector is injected to two directions toward respective spark plugs. The injected fuel is transferred to the spark plugs by tumble flow. In this case, since the mixture is stratified to two spark plugs, fuel among per each individual plug becomes smaller to reduce NOx under the same operating condition. Also, when the fuel concentration in the mixture around the spark plug is made the same as that in case of single spark plug, a range of stratified charge combustion operation can be expanded.

Figure 23:
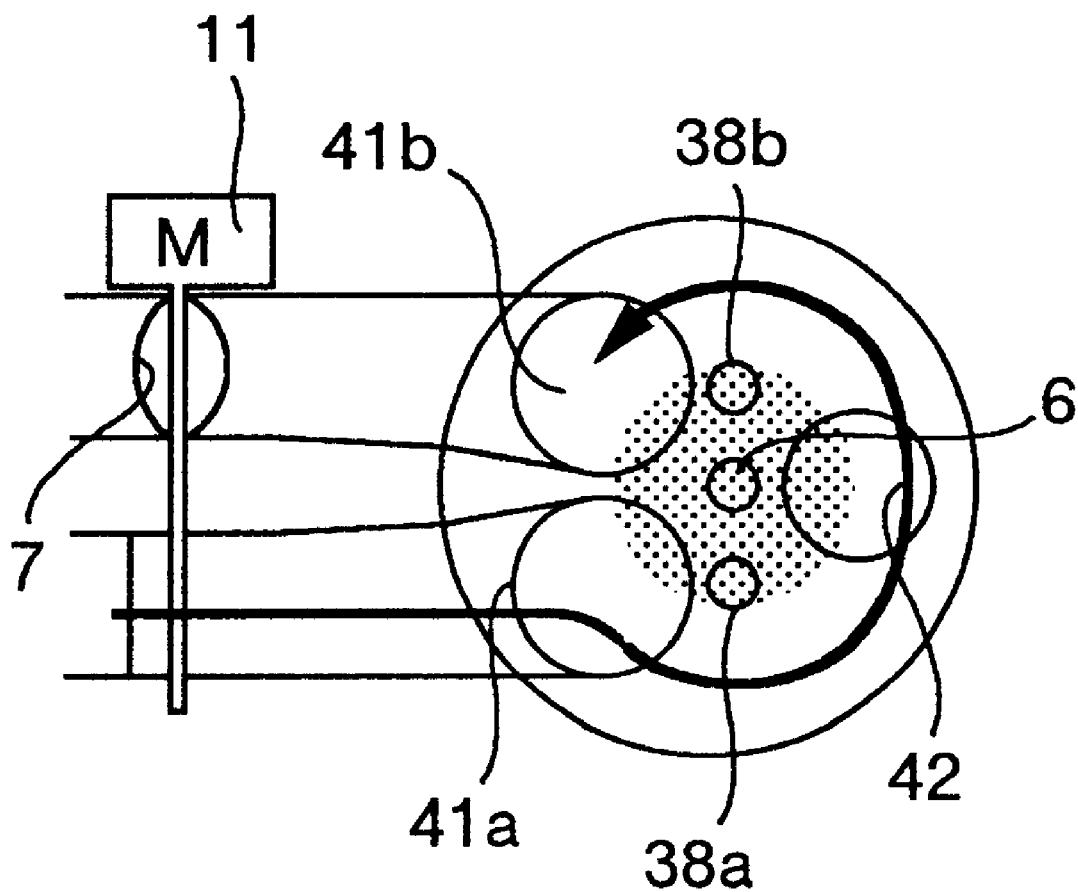
FIG. 23 is a cross section of the fourth embodiment of the engine according to the present invention.
Figure 24:
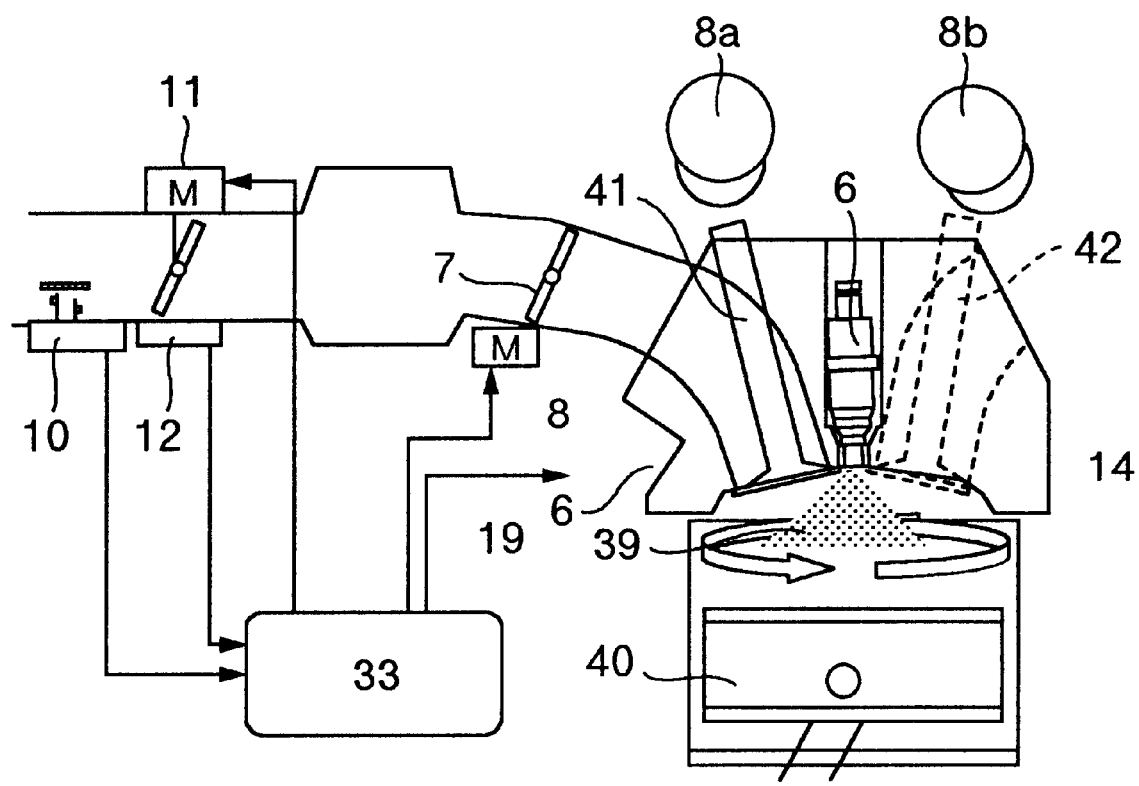
FIG. 24 is a longitudinal section of the fourth embodiment of the engine according to the present invention.
Figure 25:
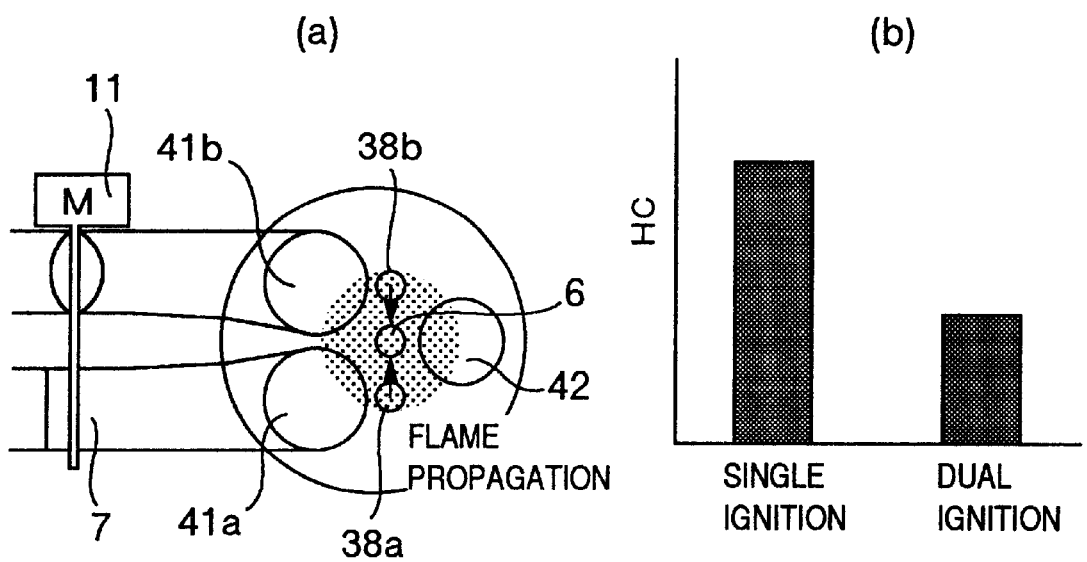
FIG. 25 is a cross section of one cylinder and HC characteristic chart for explaining operation of the fourth embodiment of the engine according to the present invention.

FIGS. 23 and 24 show the fourth embodiment of the present invention. The fuel injector 6 is arranged at the center of the cylinder. The spark plugs 38a and 38b are arranged in the vicinity of the fuel injector 6. In the intake port, the flow control valve 7 is provided for forming swirl flow. By providing the fuel injector at the center of the cylinder, the injected fuel can be easily dispersed over the entire cylinder to promote homogenization of the mixture for improving WOT torque and homogenization performance (EGR, lean burn operation). The fuel injected at the center of the cylinder is concentrated to the center of the cylinder by the swirl flow surrounding the fuel to permit maintaining of stratification even by ignition timing. By providing two spark plugs, chance of ignition for the concentrated mixture can be increased to improve ignitionability to make combustion stable. In the same operating condition, concentration of the fuel becomes low to lower combustion temperature to reduce NOx. On the other hand, as shown in FIG. 25, (a), ignition is caused in the periphery of the mixture and flame is propagated toward the center to make quenching zone smaller to reduce HC by fuel ignition in comparison with single plug ignition. Furthermore, combustion is progressed with taking burnt gas in the circumference to reduce NOx by the effect of internal EGR.

Figure 26:
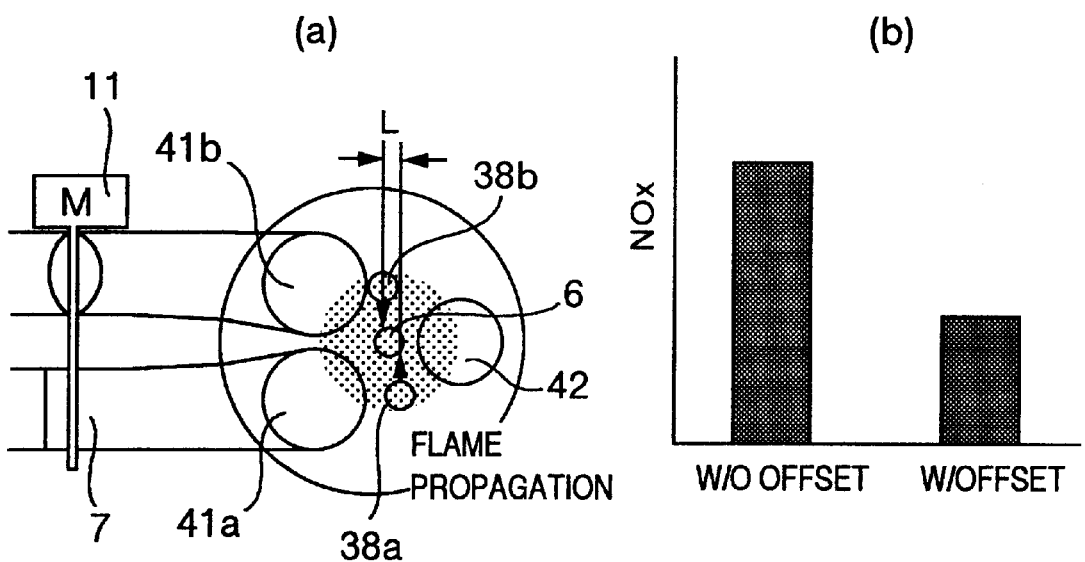
FIG. 26 is a cross section of one cylinder and NOx characteristic chart for explaining operation of another embodiment of the engine according to the present invention.

By offsetting two spark plugs as shown in FIG. 26, (a), propagated flame is concentrated to the center to prevent the fuel pressure from elevating. Therefore, NOx can be reduced as shown in FIG. 26, (b).

Figure 27:
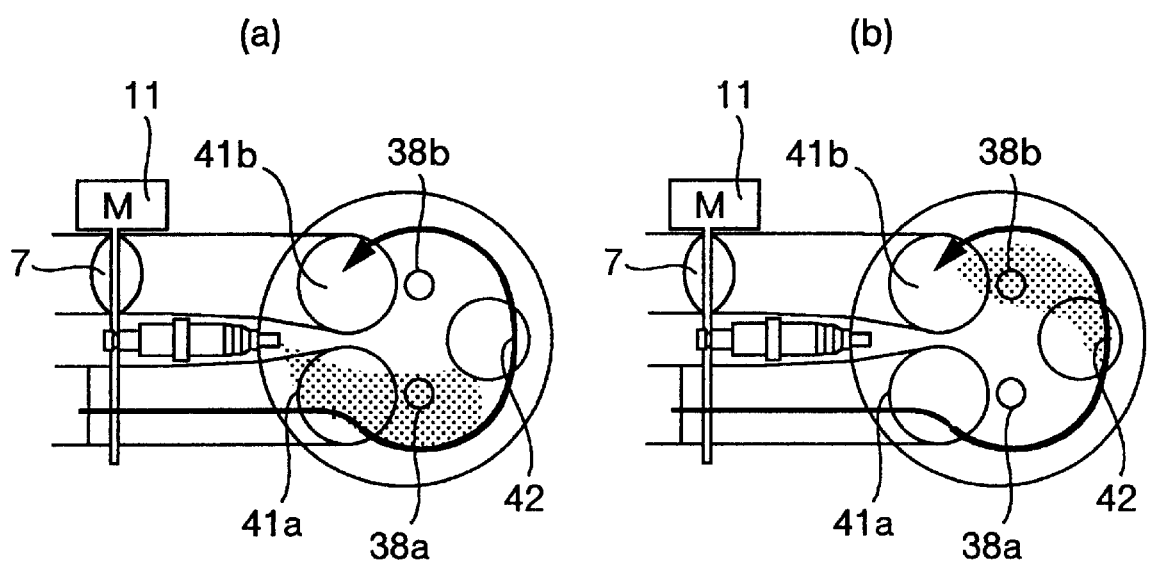
FIG. 27 is a cross section of the fifth embodiment of the engine according to the present invention.

FIG. 27, (a) and FIG. 27, (c) show the fifth embodiment of the engine according to the present invention. The fuel injector 6 is arranged in the vicinity of the wall surface on the side of the intake port of the cylinder. The spark plugs 38a and 38b are arranged in the vicinity of respective intake valves, The flow control valve 7 is provided in the intake port for forming the swirl flow. The fuel injected from the fuel injector is transported to downstream of the swirl by swirl flow to concentrate in the vicinity of the spark plugs. When the engine revolution speed is low, ignition is performed by concentrating the mixture to the spark plug 38a as shown in FIG. 27, (a). On the other hand, when the engine revolution speed becomes high, ignition is performed by the spark plug 38b located at downstream side of the swirl as shown in FIG. 27, (b). By such control, sufficient vaporization period for the fuel can be certainly provided at high engine revolution speed range to make combustion stable.

Figure 28:
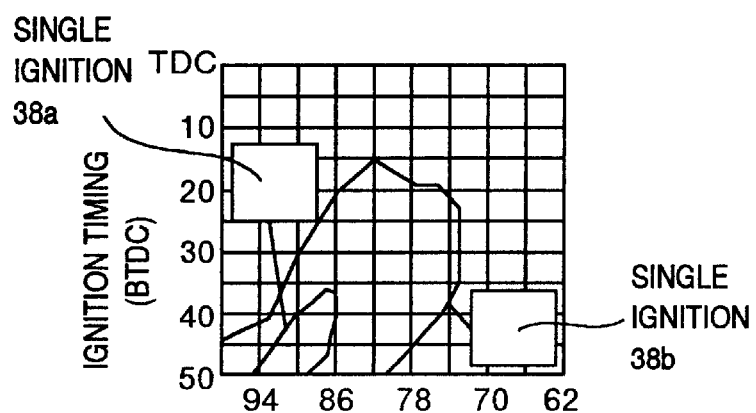
FIG. 28 shows a test result of the fifth embodiment of the engine according to the present invention.

FIG. 28 shows combustion stable range in the case of stratified charge combustion operation at 3500 rpm. By performing ignition by the spark plug 38b, stable combustion range can be expanded.

Figure 29:
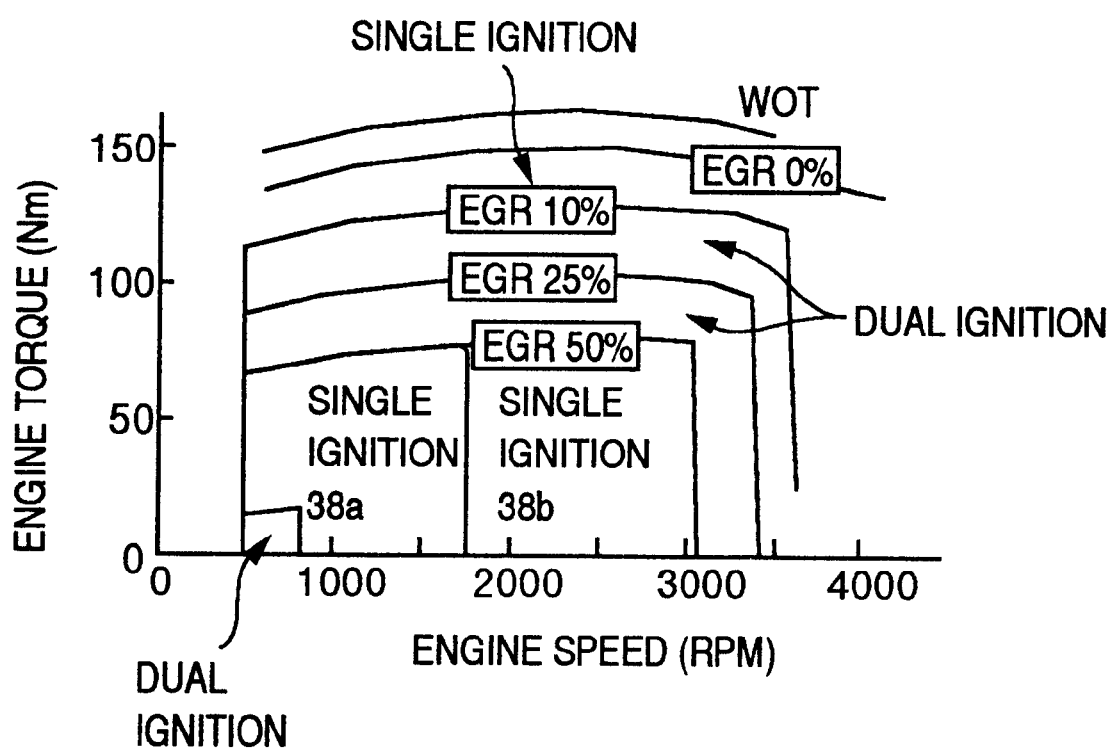
FIG. 29 is a control map of an ignition timing and a fuel injection timing.

FIG. 29 is a control method of spark ignition and EGR with respect to the engine output torque and engine revolution speed. In the engine idling condition, air flow is weak and the mixture is unstable. Therefore, dual plug ignition is performed. When the load is increased, the mixture is stratified at the spark plug 38a to perform spark ignition. At this time, fuel injection timing is in the compression stroke. At high engine revolution speed, the mixture is stratified to the spark plug 38b for ignition by the spark plug 38b. In either case, EGR amount is made large to improve fuel economy and to reduce NOx emission. For obtaining greater engine output torque, the fuel is injected in the intake stroke to form homogeneous mixture, and about 25% of the EGR gas is introduced. At this time, in order to attain high combustion velocity, fuel ignition is effected. According to increase of load, EGR ratio is reduced. By further increasing load and decreasing the EGR, the combustion velocity becomes excessively high to abruptly increase combustion pressure to make combusting sound large. Therefore, ignition is switched to the single plug ignition.

Figure 30:
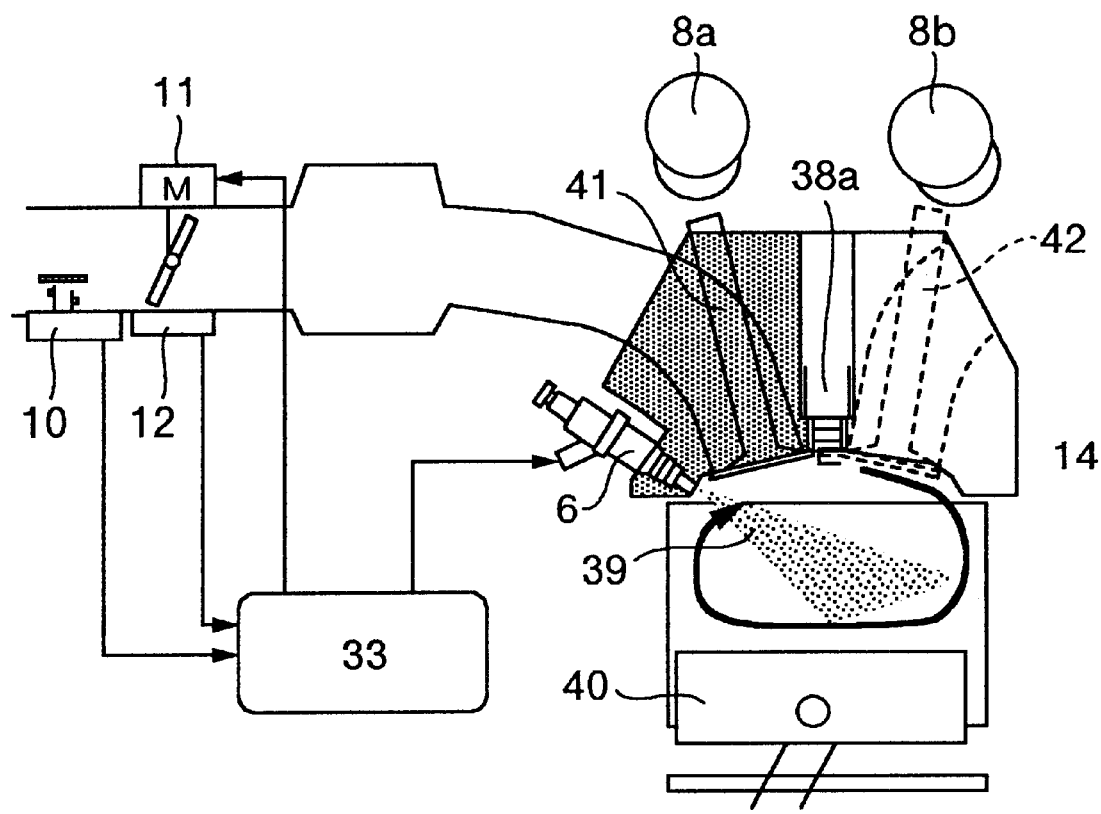
FIG. 30 is a longitudinal section of the sixth embodiment of the engine according to the present invention.
Figure 31:
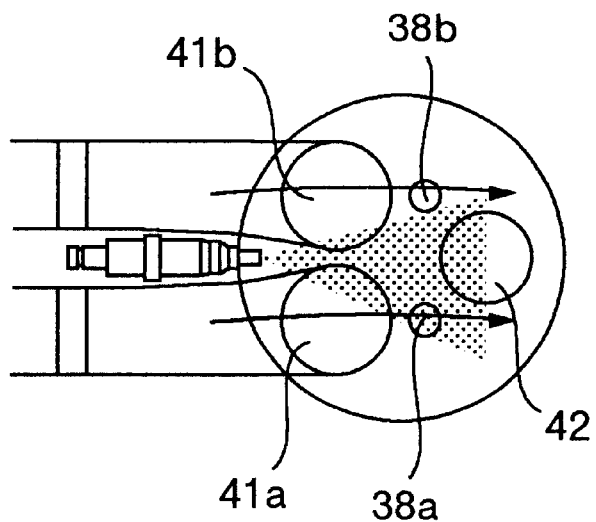
FIG. 31 is a cross section of the sixth embodiment of the engine according to the present invention.
Figure 32:
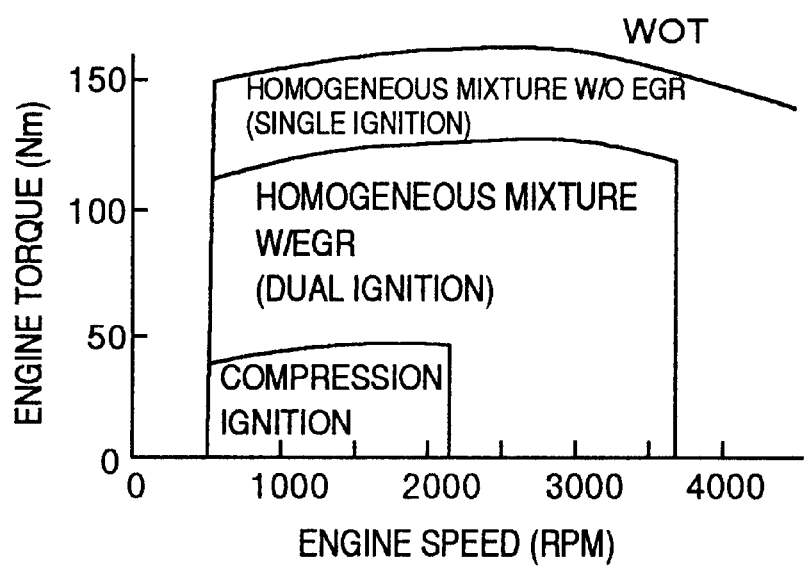
FIG. 32 shows a control map of the engine of the sixth embodiment shown in FIG. 30.
Figure 33:
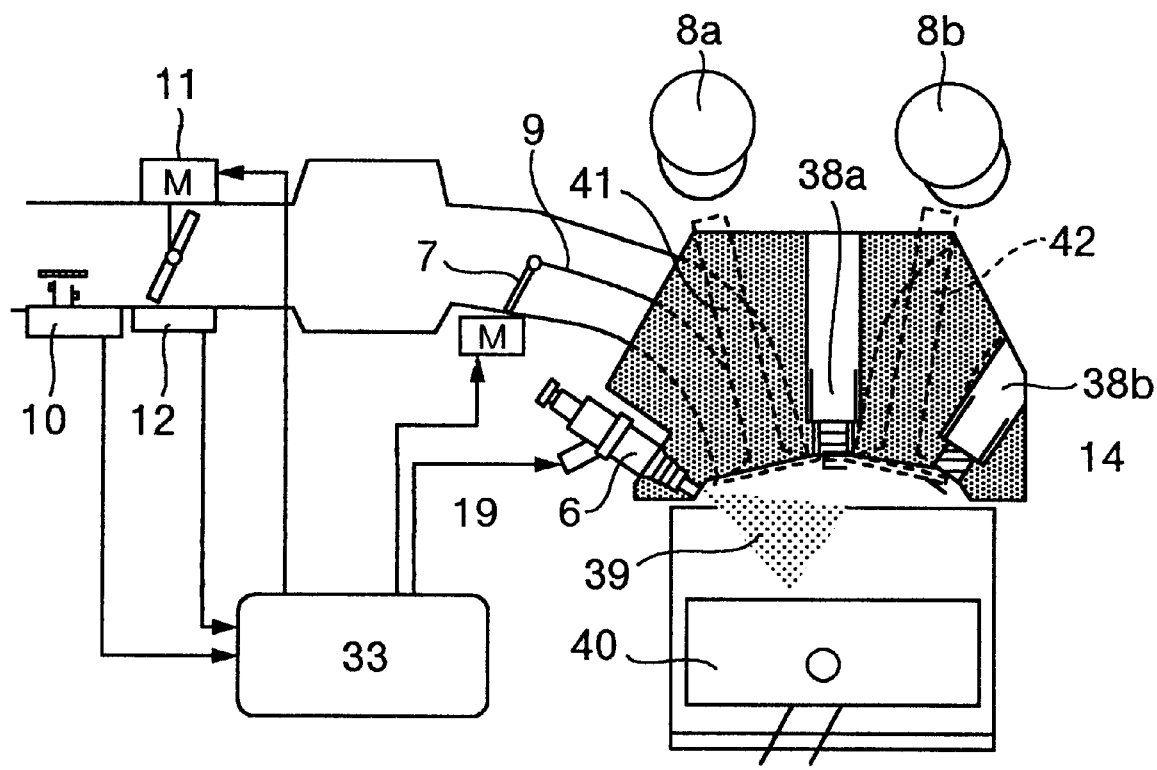
FIG. 33 is a longitudinal section of another embodiment of the engine according to the present invention.
Figure 34:
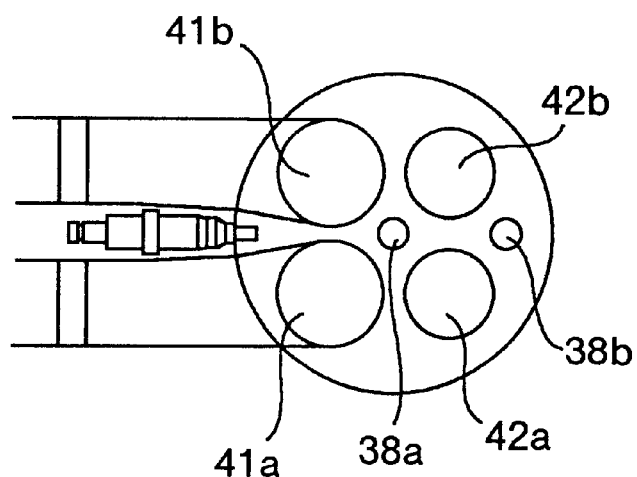
FIG. 34 is a cross section of another embodiment of the engine according to the present invention.
Figure 35:
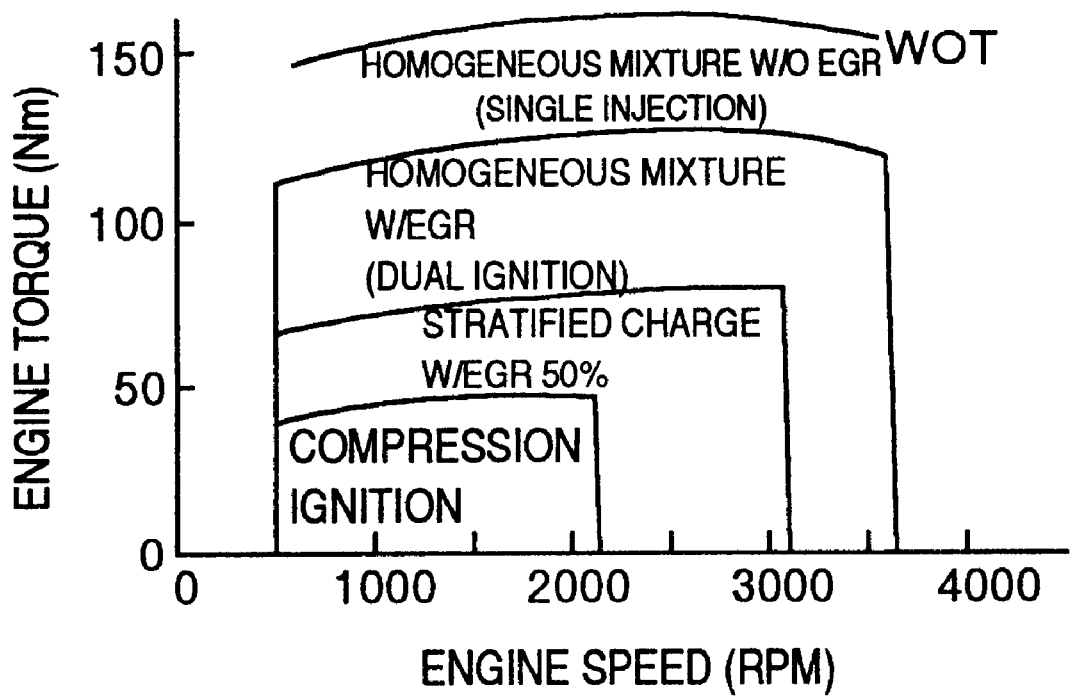
FIG. 35 shows a control map of the engine of the embodiment shown in FIG. 30.

FIGS. 30 and 31 show the sixth embodiment of the present invention. The fuel injector 6 is arranged in the vicinity of the wall surface on the side of the intake port of the cylinder. The spark plugs 38a and 38b are arranged in the vicinity of respective intake valves. In this embodiment, the homogeneous mixture is formed within the cylinder, and the flow control valve for forming swirl or tumble is not provided to simplify the construction of the induction passage. As shown in the control map of FIG. 32, homogeneous lean mixture is formed in the range where the engine output torque is small and the engine revolution speed is low. In compression ignition, ignition is caused at a plurality of points to shorten flame propagation distance at respective positions to permit lean burn in homogeneous mixture. In order to control compression ignition timing, the internal EGR amount is controlled by controlling the variable timing valve. Since the temperature of the internal EGR is high, it can be used for temperature adjustment of the mixture, and subsequent combustion velocity can be controlled. Furthermore, in the range where the engine output torque is large, the EGR gas is introduce to the homogeneous mixture for improving fuel economy and reducing NOx. Adapting to lowering of combustion velocity by EGR, fuel ignition is performed. Furthermore, in the range where the engine output torque is further large, EGR is interrupted and the single plug ignition is effected in order to prevent the combustion velocity from becoming excessively high. In the shown embodiment, in the low load operation, lean burn operation by compression ignition is performed for reducing NOx, and in the high load operation, EGR gas is introduced to the stoichiometric mixture to realize lowering of NOx. By stoichiometric operation, three-way catalytic converter can be used.

Figure 36:
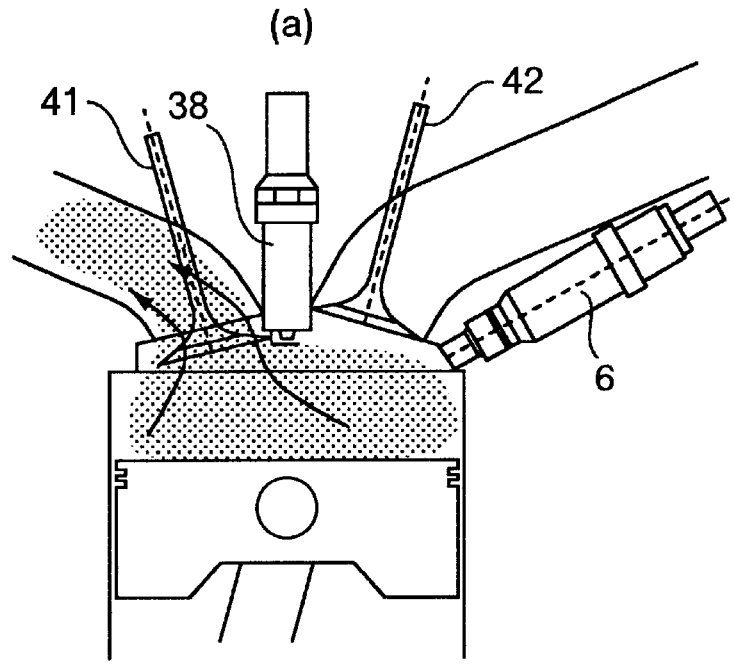
FIG. 36 is an explanatory illustration showing an exhaust gas behavior in the exhaust stroke.
Figure 36:
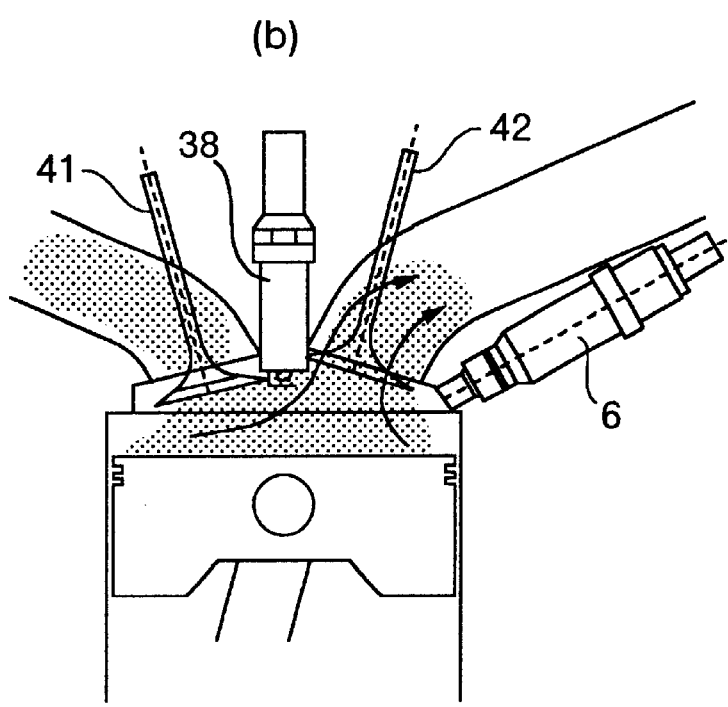
Figure 37:
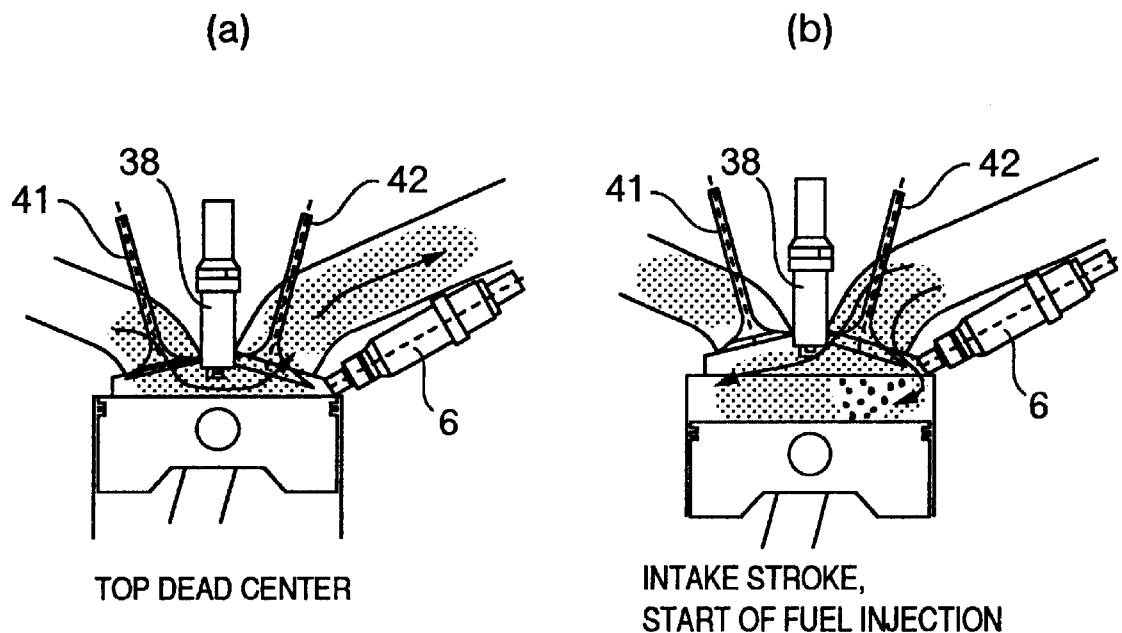
FIG. 37 is an explanatory illustration of operation in internal EGR in the intake stroke.
Figure 38:
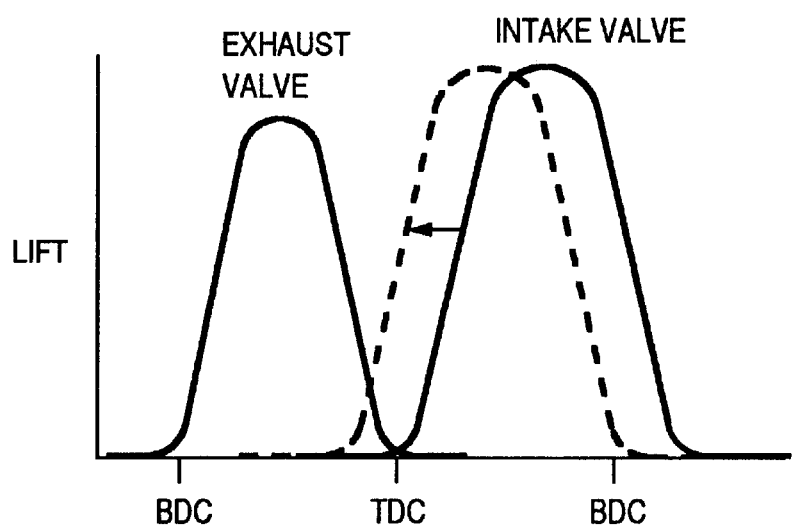
FIG. 38 is a chart showing a lift characteristics of an intake valve and an exhaust valve.

FIG. 36, (a) and FIG. 36, (b) show behavior of exhausting in exhaust stroke. When intake valve is opened slightly at later stage of the exhaust stroke, under a condition where the pressure in the cylinder is higher than the pressure of the intake pipe, exhaust gas surges into the induction pipe. Subsequently, in the intake stroke, the exhaust gas surged into the intake pipe is again sucked into the combustion chamber as shown in FIG. 37, (a) and FIG. 37, (b). By injecting the fuel in synchronism with introduction of internal EGR gas of high temperature, vaporization of the fuel can be promoted and degree of homogenization of the mixture can be improved. In the variable timing valve, the phase of the intake valve is controlled as shown by valve lift characteristics of FIG. 38. The fuel injection timing has to be controlled adapting to timing of this phase. Namely, when the timing to open the intake vale is advanced, the fuel injection timing is also advanced.

Figure 39:
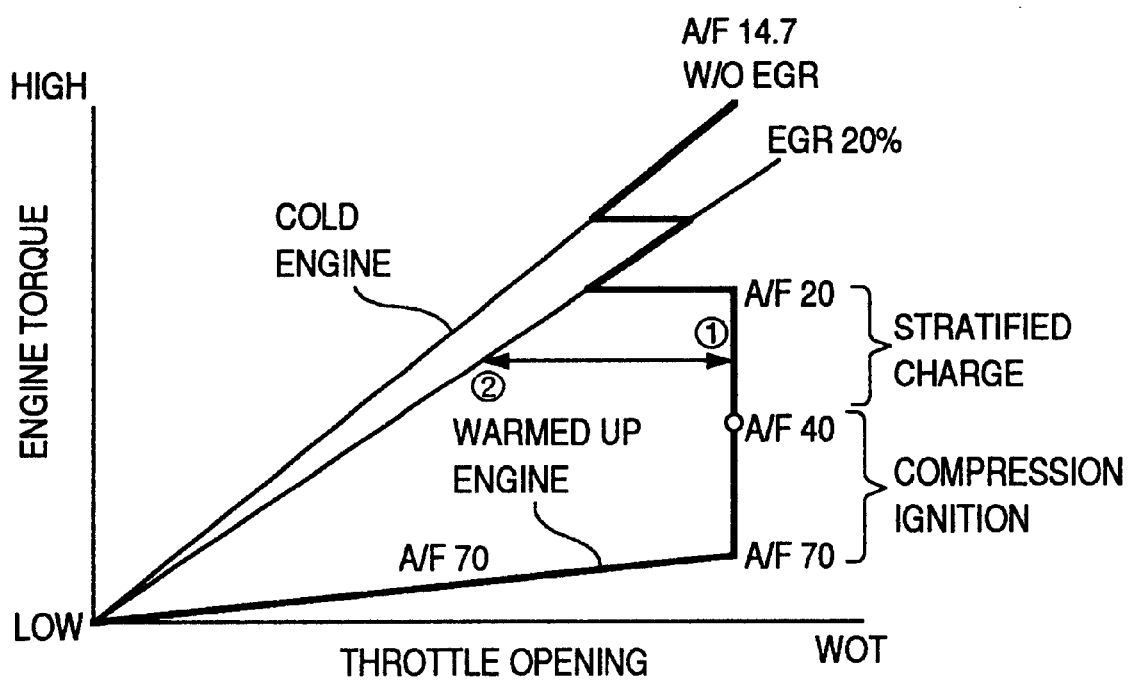
FIG. 39 is an illustration showing an example of control of an engine output torque in the embodiment of the present invention.

FIG. 39 shows an example of control of the engine output torque in the embodiment of the present invention. When the engine coolant temperature is low, fuel injection is performed in the intake stroke to be operated at the air/fuel ratio of 14.7. At this time, the throttle open degree and the engine output torque are cooperated. After warming up, the engine when the engine output torque is small, throttle control is performed with maintaining the air/fuel ratio at 70. When the engine output torque is large, compression ignition mode is set to perform torque control with making the air/fuel ratio variable. When the air/fuel ratio becomes further large, such as 40, the fuel is injected in the compression stroke to perform stratified charge combustion operation and spark ignition is performed. When the air/fuel ratio becomes greater than or equal to 20, the air/fuel ratio is set at 14.7, the EGR gas is introduced and the torque control cooperated with the throttle valve is performed. When the engine output torque becomes greater, EGR is terminated. When rich spike is required for purification of NOx during stratified charge combustion operation, operation is switched from operation mode of ① to operation mode of ⓪. For avoiding fluctuation of the engine output torque, the throttle valve is controlled and the air/fuel mixture is enriched. At this time, EGR may be effected to introduce the EGR gas. When the engine load is small and catalyst temperature is difficult to be risen fast, EGR gas may not be done in order to make the exhaust temperature higher.

NOx purification catalyst is employed for reducing Nox in lean burn operation. Then, when NOx is accumulated in the catalytic converter during lean burn operation, the air/fuel ratio is intermittently set at stoichiometric air/fuel ratio or richer to generate HC to promote deoxidization reaction of the accumulated NOx. Such intermittent rich condition is the rich spikes. When rich spikes are caused frequently, fuel economy is degraded.

Figure 40:
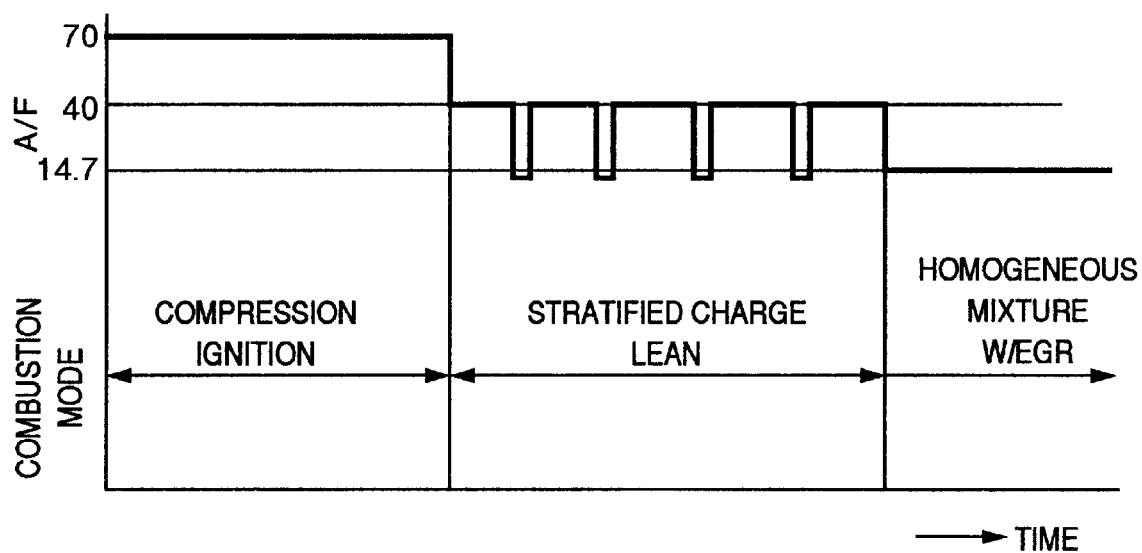
FIG. 40 is an illustration showing an example of control of rich spikes in the embodiment of the present invention.

FIG. 40 shows control of the rich spike. In the compression ignition, Nox emission is small in the extent of several p.p.m. Therefore, the rich spike control is not performed for the NOx catalyst. Even when rich spike control is performed, number of times of the rich spike and duration thereof are minimized. On the other hand, in case of stratified lean burn operation, since NOx emission is increased to apply the rich spike. At this time, the interval of the rich spike becomes shorter than that in compression combustion. In case of homogeneous 14.7 A/F with EGR control, since three-way catalytic converter is effective, rich spike control is performed.

Performing compression ignition operation and homogeneous EGR operation, if the stratified lean burn operation is not included, three-way catalytic converter is used, and rich control by NOx catalyst is not performed.

Figure 41A:
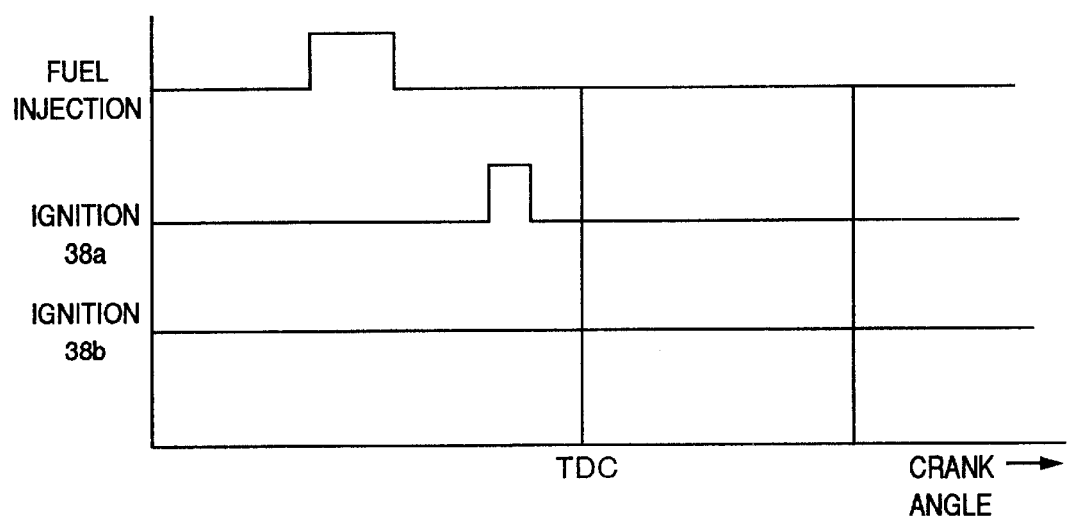
FIG. 41A is an example of an ignition control in the embodiment the present invention.
Figure 41B:
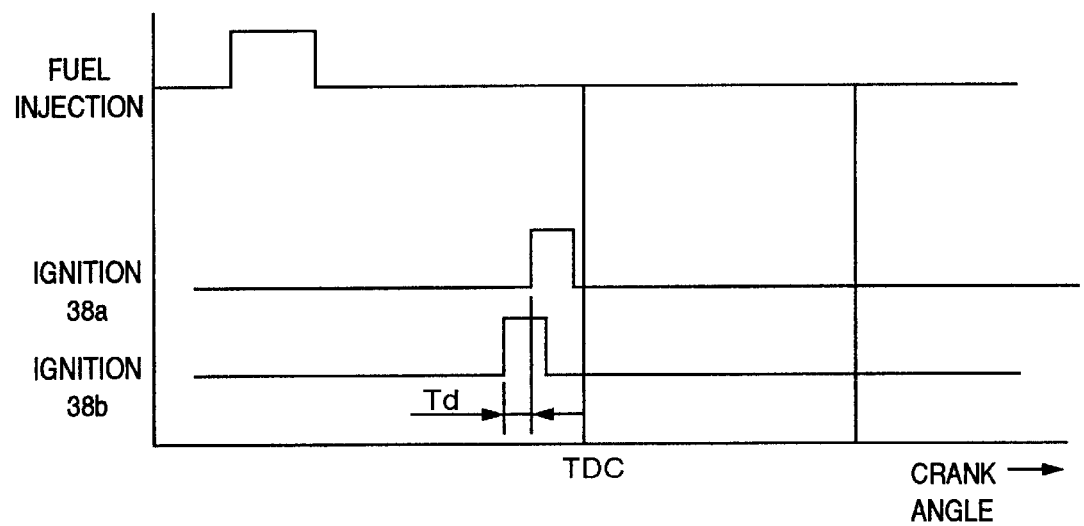
FIG. 41B is another example of an ignition control in the embodiment of the present invention.

An ignition control method is shown in FIGS. 41A and 41B. Discussion will be given in terms of the embodiment shown in FIG. 8. When stratified charge combustion operation is performed as shown in FIG. 41A, fuel injection is controlled for concentrating the fuel to one of the spark plugs. When the engine revolution speed is low (e.g. lower than or equal to 4000 r.p.m.), the injected fuel is concentrated to the spark plug 38a arranged at the center of the cylinder and spark ignition is performed by the spark plug 38a in synchronism with the timing at which the mixture reaches the spark plug. On the other hand, as shown in FIG. 41B, when the engine revolution speed becomes higher, since the period from injection of the fuel to reach the spark plug becomes short to possibly cause lack of vaporization of the fuel. Therefore, the fuel injection timing controlled to advance for concentrating the fuel to the spark plug 38b located away from the fuel injector. In this case, it is possible to effect ignition by only one spark plug 38b, or to effect ignition by the spark plug 38a after (after a period Td) ignition by the spark plug 38b. After ignition by the spark plug 38b, operation of the spark plug 38a is performed for preventing blowing off of the mixture around the spark plug 38b by flame propagation. On the other hand, air flow during idling operation becomes small to make it difficult to reach the mixture around the spark plug, it is possible to perform ignition by both spark plugs. In this case, since the period from injection to ignition becomes long, it is desirable to make the mixture concentrated to the spark plug 38a to perform ignition by the spark plug 38a in advance of ignition by the spark plug 38b.

Figure 42:
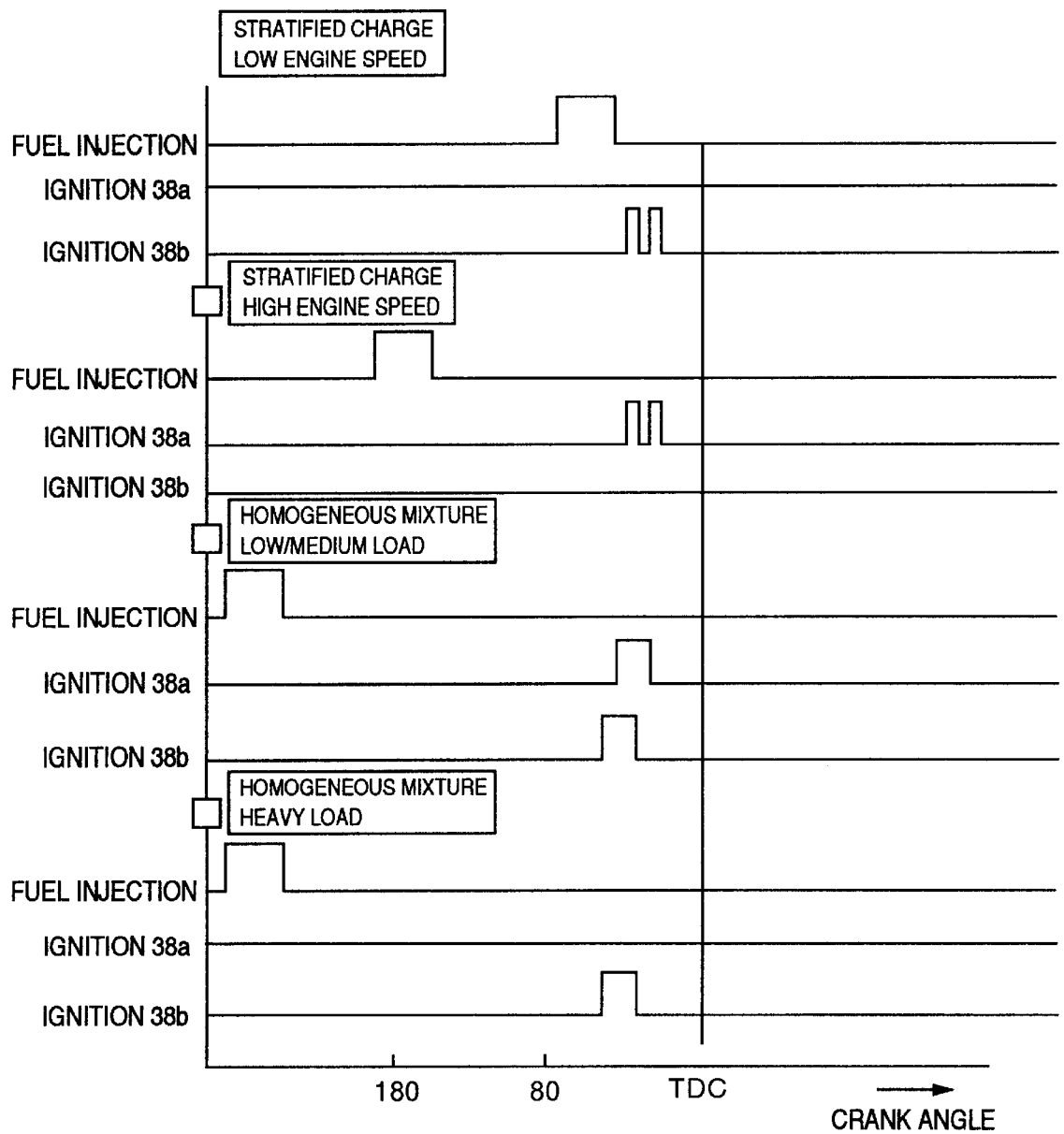
FIG. 42 is a further example of an ignition control in the embodiment of the present invention.

FIG. 42 shows another embodiment of ignition control. The shown embodiment of ignition control method will be discussed in terms of the construction shown in FIG. 18. Upon stratification at low engine revolution speed, fuel injection is performed in the compression stroke for concentrating the fuel to the spark plug 38b. In order to increase chance of ignition, spark ignition is effective twice. When the engine revolution speed is accelerated in stratified charge combustion operation, the fuel injection timing is advanced for providing the sufficiently long period from fuel injection to ignition to perform ignition when the mixture reaches the spark plug 38a. In order to increase chance of spark ignition, spark ignition may be performed twice. On the other hand, it is also possible to perform ignition by the spark plug 38b after ignition by the spark plug 38a.

In homogeneous low or medium load operation, due to application of EGR, the combustion velocity tends to be low.

Therefore, ignition is performed by two spark plugs. Ignition timing can be simultaneous at two spark plugs. However, when engine knocking is easily caused, such as in the engine having high compression ratio, temperature tends to be high. Therefore, it is desirable to make the ignition timing of the spark plug 38b on the exhaust valve side earlier. In homogeneous high load operation, combustion velocity becomes excessively high to elevate combustion pressure to make combusting sound louder if ignition is effect by two spark plugs. In such case, ignition mode is switched into single plug ignition. In this case, it is desirable to effect ignition by the spark plug 38b with which the temperature tends to be higher.

Figure 43:
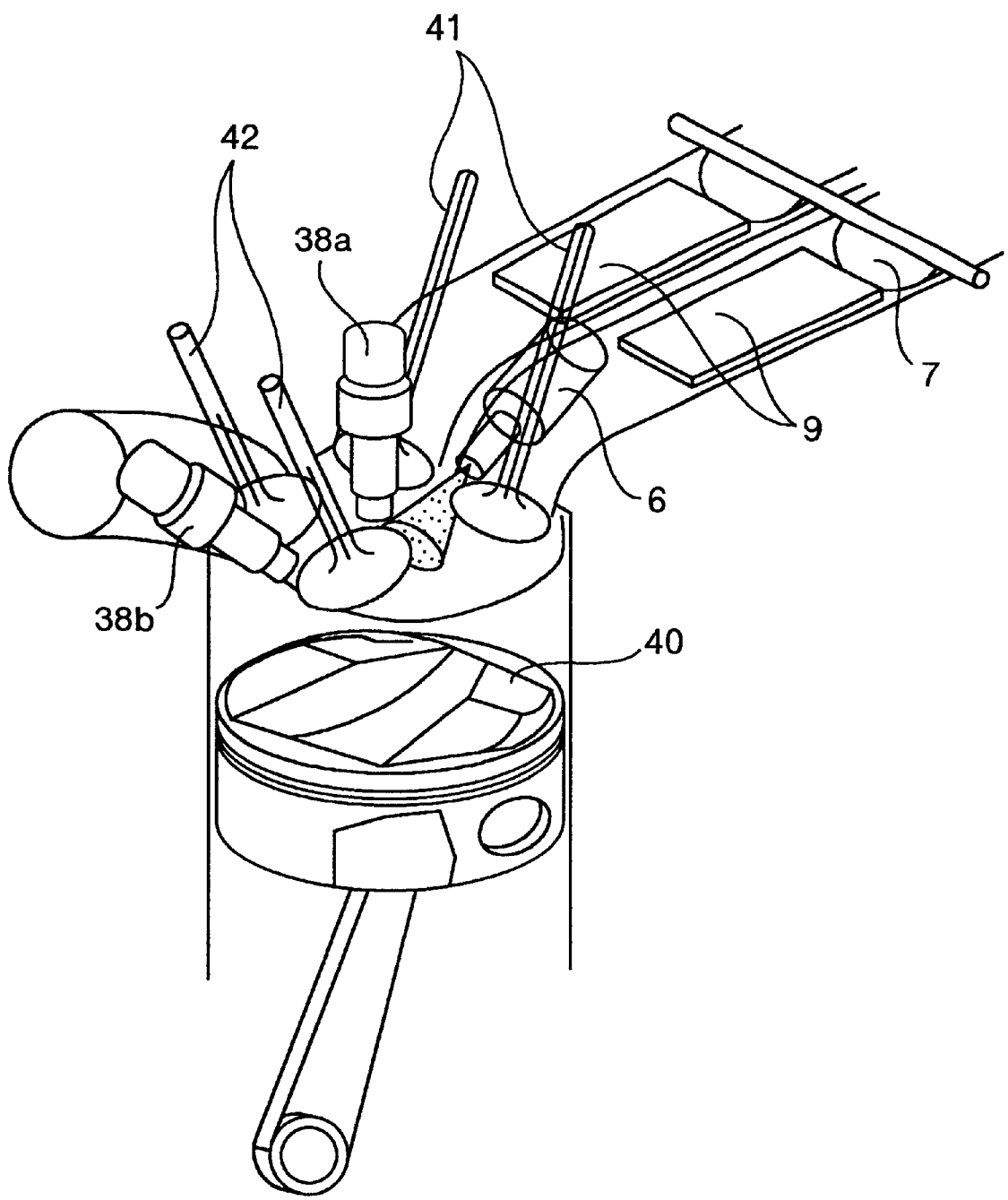
FIG. 43 is a perspective view of a cylinder of the engine in the embodiment according to the present invention.

FIG. 43 shows a perspective view of the engine of the present invention. The fuel injected from the fuel injector 6 is transferred to the spark plug 38a by tumble air flow. The fuel injection timing is set for performing injection in the compression stroke. The fuel injection timing in the compression stroke is advanced according to increasing the engine revolution speed. Tumble air flow can be formed by closing the flow control valves 7 provided in two intake port. In this embodiment, since the fuel is not transferred toward the spark plug and guided by the piston surface, the flat head piston or the head having the shape maintaining tumble flow can be employed. By the cavity formed in the upper surface of the piston, tumble air flow can be maintained in the vicinity of top dead center, and the cavity side wall may prevent the mixture from dispersing in lateral direction. In the conventional cylinder injection, large cavity or the like is formed in the piston for guiding the fuel to cause interference between the piston and the valve in the variable timing valve. Also, by increasing of the surface area in the top surface of the piston to increase cooling loss and to interfere improvement of fuel economy. In the present invention, since stratification is possible with the piston having substantially flat top surface, it is superior for improvement of fuel economy.

According to the present invention, high EGR rate operation in the homogeneous mixture becomes possible, and stratified charge combustion operation can be performed to significant improvement of fuel economy in low load to high load range. Also, reduction of NOx can be achieved.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A cylinder injection engine comprising:
   a fuel injector for injecting a fuel into a combustion chamber formed between a cylinder head and a piston;
   an intake port opening to said combustion chamber;
   an intake valve engaging with said intake port;
   a plurality of spark plugs provided for each cylinder for effecting ignition of a mixture formed within said combustion chamber;
   an external EGR valve having a function of EGR amount control to said cylinder;
   a gas flow control valve; and
   means for setting air/fuel ratio modes and for setting mode of switching spark plugs,
   wherein two spark plugs are provided in each cylinder, fuel is injected in an intake stroke, dual-spark ignition is performed under the condition where EGR is effected, and the mixture is concentrated to one of the spark plugs in stratified charge combustion operation.

2. A cylinder injection engine as set forth in claim 1, wherein when an engine revolution speed is lower than a predetermined value, the mixture is concentrated to the spark plug close to a tip end of said fuel injector, and when the engine revolution speed becomes higher than the predetermined value, the mixture is concentrated to the ignition valve located remote from the tip end of said fuel injector.

3. A cylinder injection engine as set forth in claim 1, wherein said fuel injector is arranged on the side of intake stoke side of the cylinder, a tumble control valve is employed as a air flow control means for controlling said tumble control valve in closing direction under stratified charge combustion operation for strengthen tumble for concentrate the fuel injected in the compression stroke to one of the spark plugs by the tumble flow.

4. A cylinder injection engine as set forth in claim 3, when the engine revolution speed becomes higher than the predetermined value, a fuel injection timing is adjusted so that the mixture is concentrated at the spark plug remote from said fuel injector.

5. A cylinder injection engine as set forth in claim 3, wherein two spark plugs are arranged substantially in alignment with an injection opening of the fuel injector.

6. A cylinder injection engine as set forth in claim 1, wherein an EGR amount is controlled by an EGR control valve provided in a passage connecting an exhaust pipe and an intake pipe, and opening and closing timing of the intake and exhaust valves.

7. A cylinder injection engine as set forth in claim 1, wherein said fuel injector is provided on the side of the intake valve of the cylinder, a tumble control valve is employed as a air flow control means for controlling said tumble control valve in closing direction under stratified charge combustion operation for strengthen tumble for concentrate the fuel injected in the compression stroke in the vicinity of one of the spark plugs by the tumble flow.

8. A cylinder injection engine as set forth in claim 7, wherein when the engine revolution speed becomes higher than the predetermined value, the fuel injection timing is adjusted for concentrating the mixture to the spark plug remote from said fuel injector.

9. A cylinder injection engine as set forth in claim 1, wherein said fuel injector is arranged at the top of the combustion chamber, spark portions of said spark plugs are arranged on the side of cylinder wall substantially in alignment with an injection opening of said fuel injector, a tumble control valve is employed as a air flow control means for controlling said tumble control valve in closing direction under stratified charge combustion operation for strengthen tumble for concentrate the fuel injected in an intake stroke to of one of the spark plugs remote from the intake ports upon low engine revolution speed operation by the tumble flow, and in the vicinity of the spark plug arranged on the side of the intake port at high engine revolution speed.

10. A cylinder injection engine comprising:
    a fuel injector for injecting a fuel into a combustion chamber formed between a cylinder head and a piston;
    an intake port opening to said combustion chamber;
    an intake valve engaging with said intake port;
    a plurality of spark plugs provided for each cylinder for effecting ignition of a mixture formed within said combustion chamber;

an external EGR valve having a function of EGR amount control to said cylinder;

a gas flow control valve; and means for setting air/fuel ratio modes and for setting mode of switching spark plugs, wherein said air/fuel ratio mode setting means includes at least a stratified charge lean combustion mode concentrating the mixture around the spark plug, a stoichiometric mode for forming a homogenous mixture and a homogenous lean combustion mode, and the engine has two intake valves in each cylinder, a fuel injector forming fuel spray in two directions is arranged between said two intake valves, spark plugs are arranged in the vicinity of intake valves in each cylinder, a tumble control valve is employed as a air flow control means for controlling said tumble control valve in closing direction under stratified charge combustion operation for strengthen tumble for concentrate the fuel injected in the compression stroke in the vicinity of two spark plugs by the tumble flow.

11. A cylinder injection engine comprising:

a fuel injector for injecting a fuel into a combustion chamber formed between a cylinder head and a piston;

an intake port opening to said combustion chamber;

an intake valve engaging with said intake port;

a plurality of spark plugs provided for each cylinder for effecting ignition of a mixture formed within said combustion chamber;

an external EGR valve having a function of EGR amount control to said cylinder;

a gas flow control valve; and means for setting air/fuel ratio modes and for setting mode of switching spark plugs, wherein said air/fuel ratio mode setting means includes at least a stratified charge lean combustion mode concentrating the mixture around the spark plug, a stoichiometric mode for forming a homogenous mixture and a homogenous lean combustion mode, and said fuel injector is arranged at the top of the combustion chamber, said spark plugs are arranged in the vicinity of said fuel injector, a swirl control valve is employed as a air flow control means for controlling said swirl control valve in closing direction under stratified charge combustion operation for strengthen swirl for concentrate the injected fuel in the vicinity of the spark plugs.

12. A cylinder injection engine as set forth in claim 11, wherein two spark plugs are arranged offsetting from the injection opening of said fuel injector.

13. A cylinder injection engine comprising:

a fuel injector for injecting a fuel into a combustion chamber formed between a cylinder head and a piston;

an intake port opening to said combustion chamber;

an intake valve engaging with said intake port;

a plurality of spark plugs provided for each cylinder for effecting ignition of a mixture formed within said combustion chamber;

an external EGR valve having a function of EGR amount control to said cylinder;

a gas flow control valve; and means for setting air/fuel ratio modes and for setting mode of switching spark plugs, wherein said air/fuel ratio mode setting means includes at least a stratified charge lean combustion mode concentrating the mixture around the spark plug, a stoichiometric mode for forming a homogenous mixture and a homogenous lean combustion mode, and two intake valves are provided in each cylinder, said fuel injector is arranged on the side of intake port of the cylinder, two spark plugs are respectively arranged in the vicinity of respective intake values, a swirl control valve is employed as a air flow control means for controlling said swirl control valve in closing direction under stratified charge combustion operation for strengthen swirl for concentrate the injected fuel in the vicinity of one of the spark plugs.

14. A cylinder injection engine as set forth in claim 13, wherein when the engine revolution speed is low, the fuel is concentrated in the vicinity of the spark plug located proximal side with respect to the swirl air flow direction, when the engine revolution speed becomes high, the fuel is concentrated to the spark plug located distal side with respect to the swirl air flow direction.

15. A cylinder injection engine comprising:

a fuel injector for injecting a fuel into a combustion chamber formed between a cylinder head and a piston;

an intake port opening to said combustion chamber;

an intake valve engaging with said intake port;

a plurality of spark plugs provided for each cylinder for effecting ignition of a mixture formed within said combustion chamber;

an external EGR valve having a function of EGR amount control to said cylinder;

a gas flow control valve; and means for setting air/fuel ratio modes and for setting mode of switching spark plugs, wherein said air/fuel ratio mode setting means further includes a compression ignition mode, said air/fuel ratio mode setting means includes at least a stratified charge lean combustion mode concentrating the mixture around the spark plug, a stoichiometric mode for forming a homogenous mixture and a homogenous lean combustion mode, and in compression ignition mode, an interval of rich spikes is set to be longer than that in stratified charge lean combustion operation.

16. A cylinder injection engine comprising:

a fuel injector for injecting a fuel into a combustion chamber formed between a cylinder head and a piston;

an intake port opening to said combustion chamber;

an intake valve engaging with said intake port;

a plurality of spark plugs provided for each cylinder for effecting ignition of a mixture formed within said combustion chamber;

an external EGR valve having a function of EGR amount control to said cylinder;

a gas flow control valve; and means for setting air/fuel ratio modes and for setting mode of switching spark plugs, wherein said air/fuel ratio mode setting means further includes a compression ignition mode, and said air/fuel ratio mode setting means includes at least a stratified charge lean combustion mode concentrating the mixture around the spark plug, a stoichiometric mode for forming a homogenous mixture and a homogenous lean combustion mode, upon a rich spike fuel injection is performed at stoichiometric air/fuel ratio or rich air/fuel ratio for spark ignition in intake stroke.

17. A cylinder injection engine comprising:

air flow control means for controlling air flow in a cylinder;

EGR amount control means;

a plurality of ignition means per each cylinder;

at low load condition of the engine, stratified charge combustion is performed by said air flow control means and ignition is performed by one of spark plugs of said ignition means for combustion, and at high load condition of the engine, homogeneous combustion using said EGR amount control means is performed and ignition is performed by at least two spark plugs for combustion.

18. A cylinder injection engine as set forth in claim 17, wherein in a condition where load is lower than said low load condition, compression ignition is performed for effecting ignition only by compressing a mixture without using the spark plug.

19. A cylinder injection engine as set forth in claim 17, wherein in a condition where load is higher than said high load condition, EGR by said EGR amount control means is terminated and ignition is effected by single plug ignition.

* * * * *